US010601983B1

United States Patent
Jakobsson

(10) Patent No.: US 10,601,983 B1
(45) Date of Patent: *Mar. 24, 2020

(54) VALIDATING AUTOMATIC NUMBER IDENTIFICATION DATA

(71) Applicant: RightQuestion, LLC, Portola Valley, CA (US)

(72) Inventor: Bjorn Markus Jakobsson, Portola Valley, CA (US)

(73) Assignee: RightQuestion, LLC, Portola Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,373

(22) Filed: Nov. 5, 2018

Related U.S. Application Data

(63) Continuation of application No. 14/535,064, filed on Nov. 6, 2014.

(60) Provisional application No. 61/901,322, filed on Nov. 7, 2013.

(51) Int. Cl.
*H04M 3/42* (2006.01)
*H04W 4/14* (2009.01)
*H04M 3/38* (2006.01)

(52) U.S. Cl.
CPC ....... *H04M 3/42042* (2013.01); *H04M 3/382* (2013.01); *H04W 4/14* (2013.01)

(58) Field of Classification Search
CPC ..... H04W 12/06; H04W 12/08; H04W 88/02; H04W 12/00514; H04W 12/12; H04W 4/14; H04M 3/382; H04M 3/42042
See application file for complete search history.

(56) References Cited

U.S. PATENT DOCUMENTS

| | | | |
|---|---|---|---|
| 6,073,142 A | 6/2000 | Geiger |
| 6,161,130 A | 12/2000 | Horvitz |
| 6,574,658 B1 | 6/2003 | Gabber |
| 6,721,784 B1 | 4/2004 | Leonard |
| 7,293,063 B1 | 11/2007 | Sobel |
| 7,299,261 B1 | 11/2007 | Oliver |
| 7,644,274 B1 | 1/2010 | Jakobsson |
| 7,797,752 B1 | 9/2010 | Vaidya |
| 7,809,795 B1 | 10/2010 | Cooley |
| 7,809,796 B1 | 10/2010 | Bloch |
| 7,814,545 B2 | 10/2010 | Oliver |

(Continued)

FOREIGN PATENT DOCUMENTS

WO 2018213457 11/2018

OTHER PUBLICATIONS

Author Unknown, SPAMjadoo: Ultimate Spam Protection, downloaded from "https://web.archive.org/web/20140512000636/http:/www.spamjadoo.com:80/esp-explained.htm" May 12, 2014.

(Continued)

*Primary Examiner* — Akelaw Teshale
(74) *Attorney, Agent, or Firm* — Van Pelt, Yi & James LLP

(57) ABSTRACT

Verifying caller identification information is described. A query to verify a first communications connection associated with an observed caller ID is received. Using a second communications channel, a message to a device associated with the observed caller ID is transmitted. A response to the message is received. The message is evaluated to perform a security determination. The security determination is provided as output.

23 Claims, 16 Drawing Sheets

(56) References Cited

U.S. PATENT DOCUMENTS

| | | |
|---|---|---|
| 7,831,522 B1 | 11/2010 | Satish |
| 7,899,213 B2 | 3/2011 | Otsuka |
| 7,899,866 B1 | 3/2011 | Buckingham |
| 7,917,655 B1 | 3/2011 | Coomer |
| 8,010,614 B1 | 8/2011 | Musat |
| 8,131,655 B1 | 3/2012 | Cosoi |
| 8,255,572 B1 | 8/2012 | Coomer |
| 8,489,689 B1 | 7/2013 | Sharma |
| 8,560,962 B2 | 10/2013 | Wang |
| 8,566,938 B1 | 10/2013 | Prakash |
| 8,572,184 B1 | 10/2013 | Cosoi |
| 8,583,915 B1 * | 11/2013 | Huang ............... H04L 63/0869 713/155 |
| 8,667,069 B1 | 3/2014 | Connelly |
| 8,667,074 B1 | 3/2014 | Farkas |
| 8,676,155 B2 | 3/2014 | Fan |
| 8,719,940 B1 | 5/2014 | Higbee |
| 8,752,172 B1 | 6/2014 | Dotan |
| 8,832,202 B2 | 9/2014 | Yoshioka |
| 8,949,353 B1 | 2/2015 | Beguin |
| 8,959,163 B1 | 2/2015 | Ledet |
| 8,984,640 B1 | 3/2015 | Emigh |
| 8,996,042 B1 | 3/2015 | Hannigan |
| 9,060,057 B1 * | 6/2015 | Danis ............... H04M 3/42059 |
| 9,154,514 B1 | 10/2015 | Prakash |
| 9,245,115 B1 | 1/2016 | Jakobsson |
| 9,258,314 B1 | 2/2016 | Xiao |
| 9,277,049 B1 * | 3/2016 | Danis ............... H04M 3/42042 |
| 9,338,287 B1 | 5/2016 | Russo |
| 9,471,714 B2 | 10/2016 | Iwasaki |
| 9,473,437 B1 | 10/2016 | Jakobsson |
| 9,560,506 B2 | 1/2017 | Gudlavenkatasiva |
| 9,613,341 B2 | 4/2017 | Shivakumar |
| 9,800,589 B1 | 10/2017 | Asveren |
| 9,847,973 B1 | 12/2017 | Jakobsson |
| 9,906,554 B2 | 2/2018 | Higbee |
| 9,940,482 B1 | 4/2018 | Nichols |
| 2002/0138271 A1 | 9/2002 | Shaw |
| 2002/0184315 A1 | 12/2002 | Earnest |
| 2003/0023736 A1 | 1/2003 | Abkemeier |
| 2003/0225850 A1 | 12/2003 | Teague |
| 2003/0229672 A1 | 12/2003 | Kohn |
| 2003/0236845 A1 | 12/2003 | Pitsos |
| 2004/0176072 A1 | 9/2004 | Gellens |
| 2004/0177120 A1 | 9/2004 | Kirsch |
| 2004/0203589 A1 | 10/2004 | Wang |
| 2005/0033810 A1 | 2/2005 | Malcolm |
| 2005/0060643 A1 | 3/2005 | Glass |
| 2005/0076084 A1 | 4/2005 | Loughmiller |
| 2005/0076240 A1 | 4/2005 | Appleman |
| 2005/0080857 A1 | 4/2005 | Kirsch |
| 2005/0182735 A1 | 8/2005 | Zager |
| 2005/0188023 A1 | 8/2005 | Doan |
| 2005/0188045 A1 | 8/2005 | Katsikas |
| 2005/0198173 A1 | 9/2005 | Evans |
| 2005/0216587 A1 | 9/2005 | John |
| 2005/0223076 A1 | 10/2005 | Barrus |
| 2005/0235065 A1 | 10/2005 | Le |
| 2005/0257261 A1 | 11/2005 | Shraim |
| 2006/0004772 A1 | 1/2006 | Hagan |
| 2006/0015563 A1 | 1/2006 | Judge |
| 2006/0026242 A1 | 2/2006 | Kuhlmann |
| 2006/0031306 A1 | 2/2006 | Haverkos |
| 2006/0053490 A1 | 3/2006 | Herz |
| 2006/0085505 A1 | 4/2006 | Gillum |
| 2006/0107323 A1 * | 5/2006 | McLean ............... G06F 21/33 726/23 |
| 2006/0149821 A1 | 7/2006 | Rajan |
| 2006/0153380 A1 | 7/2006 | Gertner |
| 2006/0168024 A1 | 7/2006 | Mehr |
| 2006/0168329 A1 | 7/2006 | Tan |
| 2006/0195542 A1 | 8/2006 | Nandhra |
| 2006/0206713 A1 | 9/2006 | Hickman |
| 2006/0224677 A1 | 10/2006 | Ishikawa |
| 2006/0230461 A1 | 10/2006 | Hauser |
| 2006/0253597 A1 | 11/2006 | Mujica |
| 2006/0259558 A1 | 11/2006 | Yen |
| 2006/0265498 A1 | 11/2006 | Turgeman |
| 2007/0019235 A1 | 1/2007 | Lee |
| 2007/0027992 A1 | 2/2007 | Judge |
| 2007/0038718 A1 | 2/2007 | Khoo |
| 2007/0067465 A1 | 3/2007 | Blinn |
| 2007/0086592 A1 | 4/2007 | Ellison |
| 2007/0100944 A1 | 5/2007 | Ford |
| 2007/0101423 A1 | 5/2007 | Oliver |
| 2007/0107053 A1 | 5/2007 | Shraim |
| 2007/0130618 A1 | 6/2007 | Chen |
| 2007/0143432 A1 | 6/2007 | Klos |
| 2007/0192169 A1 | 8/2007 | Herbrich |
| 2007/0198642 A1 | 8/2007 | Malik |
| 2007/0214495 A1 | 9/2007 | Royer |
| 2007/0239639 A1 | 10/2007 | Loughmiller |
| 2007/0271343 A1 | 11/2007 | George |
| 2007/0276907 A1 | 11/2007 | Maes |
| 2007/0299916 A1 | 12/2007 | Bates |
| 2008/0004049 A1 | 1/2008 | Yigang |
| 2008/0022107 A1 | 1/2008 | Pickles |
| 2008/0046970 A1 | 2/2008 | Oliver |
| 2008/0050014 A1 | 2/2008 | Bradski |
| 2008/0098237 A1 | 4/2008 | Dung |
| 2008/0104235 A1 | 5/2008 | Oliver |
| 2008/0141374 A1 | 6/2008 | Sidiroglou |
| 2008/0175266 A1 | 7/2008 | Alperovitch |
| 2008/0178288 A1 | 7/2008 | Alperovitch |
| 2008/0235794 A1 | 9/2008 | Bogner |
| 2008/0276315 A1 | 11/2008 | Shuster |
| 2008/0290154 A1 | 11/2008 | Barnhardt |
| 2009/0037350 A1 | 2/2009 | Rudat |
| 2009/0064330 A1 | 3/2009 | Shraim |
| 2009/0089859 A1 | 4/2009 | Cook |
| 2009/0210708 A1 | 8/2009 | Chou |
| 2009/0228583 A1 | 9/2009 | Pocklington |
| 2009/0252159 A1 | 10/2009 | Lawson |
| 2009/0292781 A1 | 11/2009 | Teng |
| 2009/0319629 A1 | 12/2009 | De Guerre |
| 2010/0030798 A1 | 2/2010 | Kumar |
| 2010/0043071 A1 | 2/2010 | Wang |
| 2010/0070761 A1 | 3/2010 | Gustave |
| 2010/0094887 A1 | 4/2010 | Ye |
| 2010/0115040 A1 | 5/2010 | Sargent |
| 2010/0145900 A1 | 6/2010 | Zheng |
| 2010/0198928 A1 | 8/2010 | Almeida |
| 2010/0235636 A1 | 9/2010 | Cohen |
| 2010/0257222 A1 | 10/2010 | Hamilton, II |
| 2010/0287246 A1 | 11/2010 | Klos |
| 2010/0299399 A1 | 11/2010 | Wanser |
| 2010/0313253 A1 | 12/2010 | Reiss |
| 2011/0066687 A1 | 3/2011 | Chen |
| 2011/0087485 A1 | 4/2011 | Maude |
| 2011/0145152 A1 | 6/2011 | McCown |
| 2011/0191688 A1 | 8/2011 | Hasegawa |
| 2011/0191847 A1 | 8/2011 | Davis |
| 2011/0271349 A1 | 11/2011 | Kaplan |
| 2011/0294478 A1 | 12/2011 | Trivi |
| 2012/0030293 A1 | 2/2012 | Bobotek |
| 2012/0136780 A1 | 5/2012 | El-Awady |
| 2012/0167233 A1 | 6/2012 | Gillum |
| 2012/0192258 A1 | 7/2012 | Spencer |
| 2012/0227104 A1 | 9/2012 | Sinha |
| 2012/0242488 A1 | 9/2012 | Wilson |
| 2012/0246725 A1 | 9/2012 | Osipkov |
| 2012/0278694 A1 | 11/2012 | Washio |
| 2012/0311703 A1 | 12/2012 | Yanovsky |
| 2013/0060905 A1 * | 3/2013 | Mickens ............... H04L 67/025 709/219 |
| 2013/0067012 A1 | 3/2013 | Matzkel |
| 2013/0081142 A1 | 3/2013 | McDougal |
| 2013/0083129 A1 | 4/2013 | Thompson |
| 2013/0128883 A1 | 5/2013 | Lawson |
| 2013/0305318 A1 | 11/2013 | Deluca |
| 2013/0318580 A1 | 11/2013 | Gudlavenkatasiva |
| 2013/0346528 A1 | 12/2013 | Shinde |
| 2014/0082726 A1 | 3/2014 | Dreller |
| 2014/0214895 A1 | 7/2014 | Higgins |

(56) References Cited

U.S. PATENT DOCUMENTS

| | | |
|---|---|---|
| 2014/0230061 A1 | 8/2014 | Higbee |
| 2014/0245396 A1* | 8/2014 | Oberheide .............. H04L 63/08 726/4 |
| 2014/0250506 A1 | 9/2014 | Hallam-Baker |
| 2014/0258420 A1 | 9/2014 | Dent |
| 2014/0259158 A1 | 9/2014 | Brown et al. |
| 2014/0340822 A1 | 11/2014 | Lal |
| 2014/0366144 A1 | 12/2014 | Alperovitch |
| 2015/0030156 A1 | 1/2015 | Perez |
| 2015/0033343 A1 | 1/2015 | Jiang |
| 2015/0067833 A1 | 3/2015 | Verma |
| 2015/0081722 A1 | 3/2015 | Terada |
| 2015/0100896 A1 | 4/2015 | Shmarovoz |
| 2015/0113627 A1* | 4/2015 | Curtis ..................... H04L 63/06 726/10 |
| 2015/0148006 A1 | 5/2015 | Skudlark |
| 2015/0156154 A1 | 6/2015 | Russell |
| 2015/0172233 A1 | 6/2015 | She |
| 2015/0216413 A1 | 8/2015 | Soyao |
| 2015/0236990 A1 | 8/2015 | Shan |
| 2015/0288714 A1 | 10/2015 | Emigh |
| 2015/0326510 A1 | 11/2015 | Tomlinson |
| 2015/0334065 A1 | 11/2015 | Yan |
| 2015/0363839 A1 | 12/2015 | Zolty |
| 2015/0371212 A1 | 12/2015 | Giordano |
| 2015/0381653 A1 | 12/2015 | Starink et al. |
| 2016/0014151 A1 | 1/2016 | Prakash |
| 2016/0037270 A1 | 2/2016 | Polinske |
| 2016/0087925 A1 | 3/2016 | Kalavagattu |
| 2016/0094566 A1 | 3/2016 | Parekh |
| 2016/0104132 A1 | 4/2016 | Abbatiello |
| 2016/0225897 A1 | 8/2016 | Sridhar |
| 2016/0269437 A1 | 9/2016 | McDougal |
| 2017/0005961 A1 | 1/2017 | Liebmann et al. |
| 2017/0078321 A1 | 3/2017 | Maylor |
| 2017/0091274 A1 | 3/2017 | Guo |
| 2017/0251006 A1 | 8/2017 | Larosa |
| 2017/0324767 A1 | 11/2017 | Srivastava |
| 2017/0331816 A1* | 11/2017 | Votaw .................. H04L 63/0838 |
| 2017/0331824 A1* | 11/2017 | Pender ................. H04L 63/0892 |
| 2018/0160387 A1* | 6/2018 | Chastain ............... H04W 60/04 |
| 2018/0184289 A1* | 6/2018 | Dudley ................. H04W 12/06 |

OTHER PUBLICATIONS

Author Unknown, SpamKilling, "What is AntiSpam?", downloaded from "https://web.archive.org/web/20100411141933/http:/www.spamkilling.com:80/home_html.htm", Apr. 11, 2010.

Author Unknown, SpamRestraint.com: How does it work?, downloaded from "https://web.archive.org/web/20050206071926/http://www.spamrestraint.com:80/moreinfo.html", Feb. 6, 2005.

Author Unknown, Tagged Message Delivery Agent (TMDA), downloaded from "http://web.archive.org/web/20160122072207/http://www.tmda.net/", Jan. 22, 2016.

Author Unknown, UseBestMail provides a mechanism for validating mail from non-UseBestMail correspondents., downloaded from "https://web.archive.org/web/20090106142235/http://www.usebestmail.com/UseBestMail/Challenge_Response.html", Jan. 6, 2009.

Author Unknown, V@nquish Labs, "vqNow: How It Works", downloaded from "https://web.archive.org/web/20130215074205/http:/www.vanquish.com:80/products/products_how_it_works.php?product=vqnow", Feb. 15, 2013.

Author Unknown, V@nquishLabs, How it Works: Features, downloaded from "https://web.archive.org/web/20081015072416/http://vanquish.com/features/features_how_it_works.shtml", Oct. 15, 2008.

Author Unknown, What is Auto Spam Killer, downloaded from "https://web.archive.org./web/20090215025157/http://knockmail.com:80/support/descriptionask.html", Feb. 15, 2009.

Author Unknown, White List Email (WLE), downloaded from "https://web.archive.org/web/20150912154811/http:/www.rfc1149.net/devel/wle.html", Sep. 12, 2015.

Bjorn Markus Jakobsson, U.S. Appl. No. 14/487,989 entitled "Detecting Phishing Attempts" filed Sep. 16, 2014.

Brad Templeton, "Proper principles for Challenge/Response anti-spam systems", downloaded from "http://web.archive.org/web/2015090608593/http://www.templetons.com/brad/spam/challengeresponse.html", Sep. 6, 2015.

Danny Sleator, "Blowback: A Spam Blocking System", downlaoded from "https://web.archive.org/web/20150910031444/http://www.cs.cmu.edu/~sleator/blowback", Sep. 10, 2015.

David A. Wheeler, Countering Spam by Using Ham Passwords (Email Passwords), article last revised May 11, 2011; downloaded from https://web.archive.org/web/20150908003106/http:/www.dwheeler.com/essays/spam-email-password.html, captured on Sep. 8, 2015.

David A. Wheeler, "Countering Spam with Ham-Authenticated Email and the Guarded Email Protocol", article last revised Sep. 11, 2003; downloaded from "https://web.archive.org/web/20150915073232/http:/www.dwheeler.com/guarded-email/guarded-email.html", captured Sep. 15, 2015.

E. Zwicky, F. Martin, E. Lear, T. Draegen, and K. Andersen. Interoper-ability Issues Between DMARC and Indirect Email Flows. Internet-Draft draft-ietf-dmarc-interoperability-18, Internet Engineering Task Force, Sep. 2016. Work in Progress.

Fleizach et al., "Slicing Spam with Occam's Razor", published Jun. 10, 2007, downloaded from "https://web.archive.org/web/20140214225525/http://csetechrep.ucsd.edu/Dienst/UI/2.0/Describe/ncstrl.ucsd_cse/C2007-0893", captured Feb. 14, 2014.

James Thornton, "Challenge/Response at the SMTP Level", downloaded from "https://web.archive.org/web/20140215111642/http://original.jamesthornton.com/writing/challenge-response-at-smtp-level.html", Feb. 15, 2014.

Karsten M. Self, "Challenge-Response Anti-Spam Systems Considered Harmful", downloaded from "ftp://linuxmafia.com/faq/Mail/challenge-response.html", last updated Dec. 29, 2003.

M. Jakobsson and H. Siadati. SpoofKiller: You Can Teach People How to Pay, but Not How to Pay Attention. In Proceedings of the 2012 Workshop on Socio-Technical Aspects in Security and Trust (STAST), STAST '12, pp. 3-10, Washington, DC, USA, 2012. IEEE Computer Society.

Marco Paganini, Active Spam Killer, "How It Works", downloaded from "https://web.archive.org/web/20150616133020/http:/a-s-k.sourceforge.net:80/howitworks.html", Jun. 16, 2015.

NIST. Usability of Security. http://csrc.nist.gov/security-usability/HTML/research.html.

Peter Simons, "mapSoN 3.x User's Manual", downloaded from "https://web.archive.org/web/20140626054320/http:/mapson.sourceforge.net/", Jun. 26, 2014.

R. Dhamija and J. D. Tygar. The Battle Against Phishing: Dynamic Security Skins. In Proceedings of the 2005 Symposium on Usable Privacy and Security, SOUPS '05, New York, NY, USA, 2005. ACM.

Ronald L. Rivest, "RSF Quickstart Guide", Sep. 1, 2004.

S. L. Garfinkel and R. C. Miller. Johnny 2: A User Test of Key Continuity Management with S/MIME and Outlook Express. In Proceedings of the 2005 Symposium on Usable Privacy and Security, SOUPS '05, New York, NY, USA, 2005. ACM.

A. Whitten and J. D. Tygar. Why Johnny Can't Encrypt: A Usability Evaluation of PGP 5.0. In Proceedings of the 8th Conference on USENIX Security Symposium—vol. 8, SSYM'99, Berkeley, CA, USA, 1999. USENIX Association.

Ahonen-Myka et al., "Finding Co-Occuring Text Phrases by Combining Sequence and Frequent Set Discovery", Proceedings of the 16th International Joint Conference on Artificial Intelligence IJCAI-99 Workshop on Text Mining: Foundations, Techniques, and Applications, (Jul. 31, 1999) 1-9.

Author Unknown, "An Effective Solution for Spam", downloaded from "https://web.archive.org/web/20050203011232/http:/home.nyc.rr.com/spamsolution/An%20Effective%20Solution%20for%20Spam.htm", Feb. 3, 2005.

Author Unknown, "Babastik: AntiSpam Personal", downloaded from "https://web.archive.org/web/20101031061734/babastik.com/AntiSpam-Personal/", Oct. 31, 2010.

(56) References Cited

OTHER PUBLICATIONS

Author Unknown, "bluebottle—trusted delivery", downloaded from "https://web.archive.org/web/20140715223712/https://bluebottle.com/trusted-delivery.php", Jul. 15, 2014.
Author Unknown, "Federal Court Denies Attempt by Mailblocks, Inc. To Shut Down Spamarrest LLC", downloaded from "http://www.spamarrest.com/pr/releases/20030611.jsp", Seattle, WA, Jun. 11, 2003.
Author Unknown, "First of all, Your Software Is Excellent", downloaded from "https://web.archive.org/web/20120182074130/http://www.spamresearchcenter.com/", Aug. 12, 2012.
Author Unknown, "Frequently asked questions regarding Spamboomerang: Test Drive how SPAM Boomerang treats unknown senders", downloaded from "https://web.archive.org/web/20080719034305/http:/www.triveni.com.au/Spamboomerang/Spam_Faq.html", Jul. 19, 2008.
Author Unknown, "Junk Mail Buffering Agent", downloaded from http://www.ivarch.com/programs/jmba.shtml, Jun. 2005.
Author Unknown, "No Software to Install", downloaded from "https://web.archive.org/web/201002095356/http://www.cleanmymailbox.com:80/howitworks.html", Oct. 2, 2010.
Author Unknown, "Rejecting spam with a procmail accept list", downloaded from "https://web.archive.org/web/20160320083258/http:/angel.net/~nic/spam-x/", Mar. 20, 2016.
Author Unknown, "SpamFry: Welcome to our Beta testers", downloaded from https://web.archive.org/web/20050404214637/http:www.spamfry.net:80/, Apr. 4, 2005.
Author Unknown, "Sporkie" From Syncelus Wiki, retrieved from "http://wiki.syncleus.com/index.php?title=Sporkie&oldid=1034 (https://web.archive.org/web/20150905224202/http://wiki.syncleus.com/index.php?title=Sporkie&oldid=1034)", Sep. 2015.
Author Unknown, "Stop Spam Mail, Block Offensive Materials, Save Time and Money", iPermitMail Email Firewall Version 3.0, 2003.
Author Unknown, (Steven)—Artificial Intelligence for your email, downloaded from "https://web.archive.org/web/20140607193205/http://www.softwaredevelopment.net.au:80/pge_steven.htm", Jun. 7, 2014.
Author Unknown, 0Spam.com, Frequently Asked Questions, downloaded from "https://web.archive.org/web/20150428181716/http://www.0spam.com:80/support.shtml#whatisit", Apr. 28, 2015.
Author Unknown, Affini: A Network of Trust, downloaded from https://web.archive.org/web/20100212113200/http://www.affini.com:80/main/info.html, Feb. 12, 2010.
Author Unknown, Alan Clifford's Software Page, downloaded from "https://web.archive.org/web/20150813112933/http:/clifford.ac/software.html", Aug. 13, 2015.
Author Unknown, ASB AntiSpam official home page, downloaded from "https://web.archive.org/web/20080605074520/http://asbsoft.netwu.com:80/index.html", Jun. 5, 2008.
Author Unknown, Boxbe, Wikipedia, Nov. 17, 2016, https://en.wikipedia.org/wiki/Boxbe?wprov=sfsi1.
Author Unknown, BoxSentry, An advanced email validation facility to prevent Spam, downloaded from "https://web.archive.org/web/20040803060108/http://www.boxsentry.com:80/workings.html", Aug. 3, 2004.
Author Unknown, CAPTCHA: Telling Humans and Computers Apart Automatically, downloaded from "https://web.archive.org/web/20160124075223/http:/www.captcha.net/", Jan. 24, 2016.
Author Unknown, CashRamSpam.com, "Learn More about CRS: Welcome to CashRamSpam", downloaded from "https://web.archive.org/web/20151014175603/http:/cashramspam.com/learnmore/index.phtml", Oct. 14, 2015.
Author Unknown, drcc nsj, New Features: Query/Response system and Bayesian auto-leaning, downloaded from "https://web.archive.org/web/20150520052601/http:/domino-240.drcc.com:80/publicaccess/news.nsf/preview/ DCRR-69PKU5", May 20, 2015.
Author Unknown, FairUCE: A spam filter that stops spam by verifying sender identity instead of filtering content., downloaded from "https://web.archive.org/web/20061017101305/https:/secure.alphaworks.ibm.com/tech/fairuce", posted Nov. 30, 2004, captured on Oct. 17, 2006.
Author Unknown, Home Page for "Countering Spam with Ham-Authenticated Email and the Guarded Email Protocol", downloaded from https://web.archive.org/web/20150913075130/http:/www.dwheeler.com/guarded-email/, Sep. 13, 2015.
Author Unknown, Home: About.com, downloaded from "https://web.archive.org/web/20110201205543/quarantinemail.com/" Feb. 1, 2011.
Author Unknown, How ChoiceMail Works, downloaded from "https://web.archive.org/web/20160111013759/http://www.digiportal.com:80/products/how-choicemail-works.html", Jan. 11, 2016.
Author Unknown, How Mail Unknown works., downloaded from "https://web.archive.org/web/20100123200126/http://www.mailunknown.com:80/HowMailUnknownWorks.asp#VerifyValidate", Jan. 23, 2010.
Author Unknown, Joe Maimon—Sendmail Page, downloaded from "https://web.archive.org/web/20150820074626/http:/www.jmaimon.com/sendmail/" Aug. 20, 2015.
Author Unknown, Kens Spam Filter 1.40, downloaded from "https://web.archive.org/web/20080317184558/http://www.kensmail.net:80/spam.html", Mar. 17, 2008.
Author Unknown, mailcircuit.com, Secure: Spam Protection, downloaded from "https://web.archive.org/web/20131109042243/http:/www.mailcircuit.com/secure/", Nov. 9, 2013.
Author Unknown, mailDuster, Tour 1: Show me how mailDuster blocks spam, downloaded from "https://web.archive.org/web/20070609210003/http://www.mailduster.com:80/tour1.phtml", Jun. 9, 2007.
Author Unknown, mailDuster, Tour 2: But how do my friends and colleagues send me email?, downloaded from "https://web.archive.org/web/20070609210039/http://www.mailduster.com:80/tour2.phtml", Jun. 9, 2007.
Author Unknown, mailDuster, Tour 3: How do I manage this "Allow and Deny List"?, downloaded from "https://web.archive.org/web/20070610012141/http://www.mailduster.com:80/tour3.phtml", Jun. 10, 2007.
Author Unknown, mailDuster, User Guide, downloaded from "https://web.archive.org/web/20070612091602/http://www.mailduster.com:80/userguide.phtml", Jun. 12, 2007.
Author Unknown, myprivacy.ca, "Welcome to myprivacy.ca: The simple yet effective whois-harvester-buster", downloaded from "https://web.archive.org/web/20160204100135/https:/www.myprivacy.ca/", Feb. 4, 2016.
Author Unknown, PermitMail, Products: The most advanced email firewall available for your business, downloaded from "https://web.archive.org/web/20160219151855/http://ipermitmail.com/products/", Feb. 19, 2016.
Author Unknown, Petmail Design, downloaded from "https://web.archive.org/web/20150905235136if_/http:/petmail.lothar.com/design.html", Jul. 2005.
Author Unknown, PostShield.net, Challenge And Response, downloaded from "https://web.archive.org/web/20080117111334/http://www.postshield.net:80/ChallengeAndResponse.aspx", Jan. 17, 2008.
Author Unknown, privatemail.com, how it works: Experts say the best way to control spam is to use temporary "disposable" email addresses like from Yahoo or Hotmail that can be discarded after they start getting spam., downloaded from "https://web.archive.org/web/20100212231457/http:/privatemail.com:80/HowItWorksPage.aspx", Feb. 12, 2010.
Author Unknown, Product Information, "Sender Validation is the solution to your company's spam problem.", downloaded from "https://web.archive.org/web/20140413143328/http:/www.spamlion.com:80/Products.asp", Apr. 13, 2014.
Author Unknown, qconfirm—How it works, downloaded from https://web.archive.org/web/20150915060329/http:/smarden.org/qconfirm/technical.html, Sep. 15, 2015.
Author Unknown, Say Goodbye to Email Overload, downloaded from "https://web.archive.org/web/20160119092844/http://www.boxbe.com:80/how-it-works", Jan. 19, 2016.

(56) References Cited

OTHER PUBLICATIONS

Author Unknown, sendio, "Inbox Security. Threats eliminated with a layered technology approach.", downloaded from "https://web.archive.org/web/20140213192151/http:/www.sendio.com/solutions/security/", Feb. 13, 2014.

Author Unknown, SPAM Pepper, Combatting Net Spam, downloaded from "https://web.archive.org/web/20141002210345/http://www.spampepper.com:80/spampepper-com/", Oct. 2, 2014.

Author Unknown, Spam Snag, Stop Unsolicited Emails forever!, downloaded from "https://web.archive.org/web/20081220202500/http://www.spamsnag.com:80/how.php", Dec. 20, 2008.

Author Unknown, Spam: Overview, downloaded from "https://web.archive.org/web/20090107024207/http:/www.spamwall.net/products.htm", Jan. 7, 2009.

Author Unknown, SpamBlocks is a Web based Mail filtering service which integrates with your existing mailbox., downloaded from "https://web.archive.org/web/20090107050428/http:/www.spamblocks.net/howitworks/detailed_system_overview.php", Jan. 7, 2009.

Author Unknown, SpamCerbere.com, downloaded from "https://web.archive.org/web/20070629011221/http:/www.spamcerbere.com:80/en/howitworks.php", Jun. 29, 2007.

\* cited by examiner

VALIDATING AUTOMATIC NUMBER IDENTIFICATION DATA

CROSS REFERENCE TO OTHER APPLICATIONS

This application is a continuation of co-pending U.S. patent application Ser. No. 14/535,064, entitled VALIDATING AUTOMATIC NUMBER IDENTIFICATION DATA filed Nov. 6, 2014 which is incorporated herein by reference for all purposes, which claims priority to U.S. Provisional Application No. 61/901,322, entitled VALIDATING AUTOMATIC NUMBER IDENTIFICATION DATA filed Nov. 7, 2013 which is incorporated herein by reference for all purposes.

BACKGROUND OF THE INVENTION

Determining the trustworthiness of information used to identify entities involved in communications such as text messages (e.g., SMS), email, calls, and instant messaging can be challenging. For example, information such as Automated Number Identification (ANI) information can be spoofed by unscrupulous entities, making it difficult for caller identity information to be trusted by customer support centers. As a result, organizations face high fraud risks, or employ resource-intensive measures in order to identify callers and senders of messages.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for ascertaining the identity of a device initiating a communication. Using the techniques described herein, potential attempts at spoofing of caller ID or automatic number identification (ANI) data (or any other type of caller identification) can be detected. As will be described in more detail below, example techniques disclosed herein include a client-side (e.g., end-user phone-side) agent that sends confirmation information to verification entities as a result of detecting outgoing communication or being prompted to validate communication session information. The transmitted information is validated by a verifying entity using information relating to the session and to the client device, and a security determination is made. Based on the security determination, a relying party, such as a callee or a vendor associated with the callee, makes a policy-based decision to determine the most favorable action, for example, using a risk based assessment.

Environment

Figure 1:
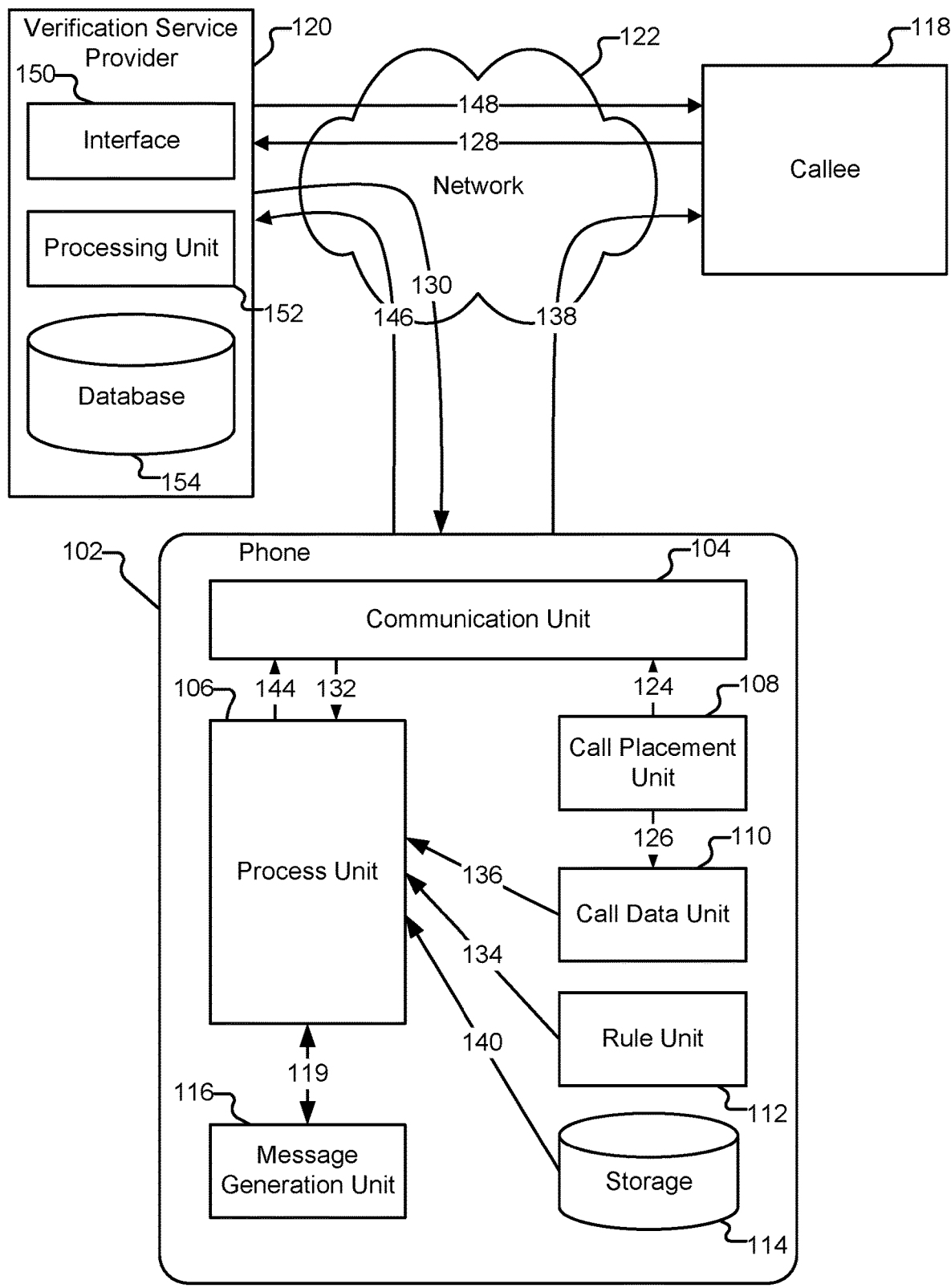
FIG. 1 illustrates an embodiment of an environment in which verification of caller identification information is performed.

FIG. 1 illustrates an embodiment of an environment in which verification of caller identification information is performed. In the example shown, client device 102 is a device with telephonic capabilities that is used, by a user, to contact callee 118 (e.g., a bank). When contacting callee 118, automatic number identification (ANI) data, such as caller id, for the calling device 102 is presented to the callee. In this example, verification service provider 120 is requested by the callee to verify the automatic number identification data of device 102, for example, to make a security determination as to whether the ANI data is being spoofed.

Device 102 includes a call placement unit 108 that is used to initiate, at 124, a phone call or an SMS over network 122 to callee 118. Call placement unit 108 is configured to store, at 126, call data in call data unit 110.

In response to being contacted by device 102, callee 118 sends a request (128) for verification of the call (e.g., verification of ANI data indicated by the call) to verification service provider 120. Verification service provider 120 is configured to determine whether callee 118 is permitted to make this request. In this example, verification service provider 120 determines that callee 118 is permitted to make the request for verification, and in response, verification service provider 120 transmits a request 130 to telephonic device 102.

The request 130 made by the verification service provider to device 102 is received by communication unit 104 of device 102. In the example shown, an associated request is sent at 132 to process unit 106, which is configured to determine whether verification service provider 120 is permitted to make request 130. In this example, it is determined whether the verification service provider is permitted to make request 130 by using a rule obtained, at 134, from rule unit 112. If verification service provider 120 is determined to be permitted to make the request 130 to device 102, then process unit 106 obtains, at 136, call data related to the associated call 138. Process unit 106 can also optionally retrieve at 140 a secret key from storage 114.

In the example shown, process unit 106 interacts at 119 with message generation unit 116, which is configured to generate a message that is sent at 144 to communication unit 104, and then sent at 146 to verification service provider 120.

In this example, verification service provider 120 is configured to evaluate the message received from device 102. Based on the evaluation, the verification service provider is configured to make a security determination, which is then communicated, at 148, to callee 118, or any other appropriate entity associated with callee 118. Based on the security determination received from the verification service provider at 148, callee 118 makes a security decision.

In various embodiments, the calling device, callee, and verification service provider communicate with each other over one or more communications channels (represented herein as a single network cloud 122), such as a telephonic network, cellular network, cellular data network (e.g., 3G/4G), the Internet, Wi-Fi, Bluetooth, audio, SMS, phone call, RDMA, interprocess communication within the same system, or any other appropriate communication channel/network.

In the example shown, verification service provider 120 includes interface 150, processing unit 152, and database 154. In some embodiments, interface 150 is used to communicate information (e.g., over network 122) with various entities, such as callee 118 and telephonic device 102. For example, the communications can include transmitting requests for verification, receiving responses to verification messages, or any other appropriate communications via the interface. In some embodiments, processing unit 152 is configured to perform verification processing. For example, verification processing can include generating messages, processing responses, performing security determinations, etc. In some embodiments, database 154 is a data store configured to store information associated with performing verification. For example, as will be described in more detail below, in some embodiments, the verification service provider uses the data store to store such information as user records, device records, enrollment information, or any other appropriate information.

Verification service provider 120 is illustrated as a single logical device in FIG. 1. In some embodiments, verification service provider 120 comprises standard commercially available server hardware (e.g., a multi-core processor, 4+ Gigabytes of RAM, and one or more Gigabit network interface adapters) and runs typical server-class operating systems (e.g., Linux), and also runs Apache HTTP Server software. Verification service provider 120 can also be implemented using a scalable, elastic architecture and may comprise several distributed components, including components provided by one or more third parties. Further, when verification service provider 120 is referred to herein as performing a task, such as storing data or processing data, it is to be understood that a sub-component or multiple sub-components of verification service provider 120 (whether individually or in cooperation with third party components) may cooperate to perform that task.

In some embodiments, the callee incorporates at least some of the features described herein as being provided by verification service provider 120, and a separate verification service provider 120 (or at least a portion thereof) is omitted, as applicable.

Validating Caller Identification Information

Described below are further details regarding validation of caller ID or ANI data.

In the above example of FIG. 1, performing validation of caller ID or ANI data includes a verification service provider sending a message to the phone number that is observed from the caller ID or ANI data. In some embodiments, a backchannel is used for communication of a message between a verification service provider and a phone or other end-user device. The verification service provider is prompted to initiate communication with the phone at the request of the callee entity contacted by the phone (e.g., a service provider such as a bank or other entity) that the user of the phone is calling using the phone. In response to the request by the callee (also referred to herein as a "relying party" that relies on the verification services of the verification service provider), the verification service provider then transmits the message. In some embodiments, the message includes a component that is difficult (if not impossible) to predict by a potential attacker, such as a serial number, a counter, a pseudo-random or random number, a number specific to the session or the phone, or any other appropriate component value. In various embodiments, the back channel uses one or more communication technologies, such as an Internet data channel, a proprietary network with a WiFi or Bluetooth endpoint communicating with the phone, short message service (SMS), or any other appropriate back channel. A component on the phone is configured to intercept or receive the message and initiate a response to the verification service provider, the callee, or a party associated with one of these entities. In some embodiments, the response makes reference to at least one part of the message. Further, in some embodiments, the message contains indications dictating the manner of responding, including to what entity, what communication channel, and what the formatting of the response should be. The verification service provider transmits at least one message over at least one communication channel to the phone as a result of the request from the service provider. In one embodiment, multiple effectively simultaneous messages are transmitted, for example, using a data channel over the Internet as well as using SMS.

In some embodiments, the message is different for different channels. For example, the messages sent over the different channels can have different non-predictable components. The verification service provider stores a state associated with each session, where this state is associated with the messages that are generated and sent. This allows later verification of the responses. In other embodiments, the verification service provider stores a secret value that allows verification of responses without having to access a session-specific state. Depending on the connectivity of the phone at the time of the transmission of the message, one of the messages may arrive before another. The different messages may correspond to different modes of creating the response, which, in some embodiments, is either indicated as part of the message or is implicitly conveyed to the phone. In one example embodiment, a message that is received using one channel, such as SMS, is always responded to using the same channel, since there is evidence that this channel is available. Alternatively, in other embodiments, the phone generates multiple responses utilizing different communication channels, using each one of these channels to transmit a response, where each such response corresponds to the message. In one embodiment, the response on the second channel will contain information about the call on the first channel, including one or more of the phone number, call start time, and call end time.

In one embodiment, the verification service provider is the recipient of the response. As the response is received, it is verified whether the response corresponds to the message. If it is verified that the response corresponds to the message, then a positive security determination is made. If an invalid response is received, or no response at all is received within some threshold amount of time, then a negative security determination is made. The verification service provider generates a variety of different positive security determinations based at least in part on the channels used for transmitting the message from the verification service provider to the phone. If SMS is used, for example, then the generation and transmission of an associated response is evidence of the phone having received the message, which in turn is evidence of the phone being associated with the phone number used for the transmission of the SMS. In some embodiments, the verification service provider also generates a variety of positive security determinations based on a state associated with the phone that is used to generate the response. For example, if the process running on the phone that generates the response uses a number that is effectively unique to the phone and stored in memory accessible by the phone, in order to create the response, then the response is an indication of the message having reached the phone and the response being generated by the phone. In some embodiments, the effectively unique number is also stored by the recipient of the response or a unit associated with the recipient, and is used to validate the response to verify that it corresponds to at least one of the message and the state associated with the phone.

In one embodiment, portions of the verification process are performed as part of an application (also referred to herein as an "app") that is installed on an end-user phone device. In some embodiments, the app receives notifications from the operating system of the phone when a message is received, for example, by subscribing to SMS events. In some embodiments, the processing performed by the app includes removing the message (e.g., received from the verification service provider) so that the message is not seen by the end-user, for example, in order to improve the user experience. For example, in the event that SMS is used, the SMS message can be removed such that the message is not presented, for example, automatically, by an operating system of the phone. In some embodiments, suppressing the communication of the message by the telephonic device to the user can also be beneficial if the channel that is used to communicate the message is a regular phone call from a number associated with the verification service provider, in order for that phone call to not be noticeable by the end user of the telephone device. In various embodiments, the portion of the verification processing performed on the device is associated with a software, firmware or hardware component associated with the phone, and is able to access incoming messages.

In some embodiments, the message includes conveyance of information associated with receiving a phone call, for example, where the phone call does not have to be conveyed to the user in any manner, and where the message is implicit in the information associated with the call. For example, the verification service provider can place a call or SMS to the phone from a number associated with the verification process. When the phone is notified of this phone call, it suppresses the conveyance of it to the end user. In some embodiments the phone call is terminated as soon as the device has observed the caller id information, without receiving the call. This can also lower the costs of operating the service. In this example, the message is the fact that the number associated with verification was observed, or a number out of a collection of available numbers associated with the verification service provider was used. In other embodiments, a message is implicitly communicated over a communication channel by the selection of a phone number used to place a call, or the forging of caller id information to convey a message.

In another embodiment, the backchannel is not a separate channel, but is encoded in the primary communication channel. In some embodiments, the encoding of the backchannel in the primary communication channel is performed in a manner that does not degrade the quality of the session in a noticeable manner. For example, suppose that a verification server entity is a component of the callee entity or uses the callee as a proxy for the backchannel communication. The verification server entity creates a signal that encodes a request that is sent to the calling device using the first communication channel. This signal is created in a manner such that it is unlikely to be noticeable to the human caller, but is detectable by an agent residing on the caller phone. The agent on the phone extracts the signal and decodes it, after which the agent generates a response message. The response message is sent to the verifying service, either using a separate communication channel or using the first communication channel. In the latter case, the message is again encoded and transmitted in a manner that is unlikely to be noticeable to human users, but which is extracted and decoded by a corresponding agent associated with the caller. Examples of techniques for creating signals in a manner such that they are not noticeable include techniques used within the field of steganography, as applied to the audio signal; and to use short bursts of signals in frequency bands that do not interfere with a communication, such as static signals that will be barely audible. The decoded signal is then evaluated as described above. In some embodiments, the request and the message in response to the request are both communicated in a manner that would be audible under normal circumstances, but which is suppressed from the end user, and removed from the received signal after it has been extracted.

In one embodiment, portions of the above-mentioned verification process are performed as part of an application (also referred to herein as an "app") that is downloaded by an end user and installed on the end-user device (e.g., smartphone, tablet, etc.). For example, the app can be an app that is specifically intended to address the caller id validation, and which may do this for one or more relying parties that would like to know that the caller id information they obtain when receiving a phone call is valid. As another example, portions of the above-mentioned verification process may be part of an app that has another primary purpose, such as a bank app that allows users to access their bank account from their handset. In this case, the process for validating caller id may interact with only the bank associated with the app, or with a collection of entities that are approved by the bank or a party producing the app. In another embodiment, the verification processing performed by the device is pre-installed on the device by a chip manufacturer, such as the original equipment manufacturer (OEM), or a carrier associated with the device. For example, the verification processing configured to be performed by the device may be part of the operating system routines or apps that are preloaded on the device at the time of purchase.

In one embodiment, data stored along with the process indicates what phone number(s) are associated with the verification service provider. In various embodiments, this data is stored on the device at the time of installation, at the time of configuration, or as the process is first used. In some embodiments, data stored along with the verification process contains certificates used to verify such phone numbers. In other embodiments, instructions are used to validate updates of such data, whether received as part of patches or associated with communication with the verification service provider (or an entity associated with the service provider). In some embodiments, verification data and verification instructions are used to verify numbers associated with the verification service provider, which may be a distributed service run by one or more independent organizations. In other embodiments, instead of associating one or more phone numbers with the verification service provider, other information is associated with the verification service provider, such as one or more public keys, one or more secret keys, one or more IP addresses, one or more elements of device information, one or more instant message addresses, or any other appropriate information. In some embodiments, this information is secured and/or verified in a manner similar to how information related to phone numbers is secured and/or verified.

As the second communications connection is established between a verification service provider and a potential calling device, the device determines whether the connection is associated with a phone number associated with the verification service provider, for example, using automatic number identification techniques and performing a comparison to a list (e.g., whitelist) of phone numbers or using an execution of a rule. If a match is determined, then the above-described verification process optionally suppresses the conveyance to the device end user of the second communications connection and associated data. Additionally, in some embodiments, if a match is determined, then a message is computed based on at least one of the ANI information associated with the second communications connection, data associated with the initiator of the second communications connection, data communicated using the second communications connection, and data associated with the communication (e.g., channel data, start time of the communication, a value stored in a memory associated with the device, etc.). In some embodiments, a connection is established to a phone number associated with the verification service provider and the message is communicated over the established connection. In other embodiments, a phone number or an address is computed or selected based on at least one of the ANI information associated with the second communications connection, data associated with the initiator of the second communications connection, data communicated using the second communications connection, and a value stored in a memory associated with the first device. A message associated with the second communications connection is then transmitted to the computed or selected destination. In another embodiment, the message is communicated over the first communications connection (primary communication channel used to contact a callee), where the message is computed based on at least one of the ANI information associated with the second communications connection, data associated with the initiator of the second communications connection, data communicated using the second communications connection, and a value stored in a memory that was previously associated with the device.

In some embodiments, where multiple communication channels are available for the telephonic device to send a response, the phone can dynamically select between available options. In various embodiments, the channel selection is based on a variety of factors including cost, availability, reliability, and latency.

In some embodiments, the verification processing resident on the device determines that a phone call is placed, generates a message based on a value stored in a memory associated with the device, and transmits the generated message to a verification service provider at the time that the phone call is made. In some embodiments, the determination is performed, for example, by subscribing to relevant events, or by modifying the interrupt or event handlers, the phone number selection, the phone number entry, the operating system, or one or more drivers. In some embodiments, the message includes a timestamp of the call, such that the message cannot be replayed later. In some embodiments, the message includes or is associated with the number to which the phone call is placed. One example implementation is for the message to be a message authentication code on the phone number called, where the message authentication code is at least one of a counter value and an additional value that may be pseudo-randomly generated, for example, using a key that is stored on the device and also stored in a memory associated with the verification service provider (where the key is associated with the device in the memory associated with the verification service provider). The generated message is then communicated over a communication channel to the verification service provider.

As described above, in some embodiments, the message sent to the verification service includes a timestamp, which can be used to prevent a replay attack. For example, the timestamp can be used by the verification service to score the validity of the communication, where an old or aged timestamp may be indicative of an attack.

In some embodiments, the verification service automatically forwards call information to the relying party (or, in some embodiments, the relying party polls the verification service as needed). In various embodiments, the call information includes one or more of: invalid number, unknown number, no call in progress, the call start time (if there is a call in progress), the phone number for the current call, and a score indicating the validity of the number. The relying party evaluates this information using, for example, custom verification processing and policies, including the use of information about the user account or user access, in addition to the verification processing performed by the verification service provider. If the call information is automatically forwarded, the information from the verification service provider may arrive before the call is answered by the relying party, which allows the relying party to automatically determine how the call should be handled. In one embodiment, the call information (which can include one or more of device id, symmetric key, call start time, and number called) is sent through the same channel as audible sounds or as sounds that are not noticeable to the user, as described above, which the relying party matches against the ANI for the incoming call.

In some embodiments, the calling device is enrolled with the verification service provider, and the message communicated from a previously enrolled device to the verification service depends on at least one of a timestamp, a unique identifier, a symmetric key, and device information, which is passed to the Verification Service to prevent, for example, attempts to spoof the legitimate device. In some embodiments, the verification service evaluates the device information and unique identifier to determine a match against previous usage of the device that is recorded and stored at the verification service. Examples of device information include one or more unique or semi-unique software identifiers; one or more embedded hardware identifiers; a user-added hardware identifier like an SD Card or geolocation information; and a device "fingerprint" created from a combination of device settings, installed applications, system or application software versions, or contact list stored on the phone. In some embodiments, the device information is combined with other information, such as the time on file for the device, to create a single validity score that is available to the relying party for the current call. In some embodiments, the verification service creates a verification score for a device when a call is initiated. In various embodiments, the verification score is created using a variety of approaches that include one or more of combining the available factors to create a score by applying relative weighting to each of the available factors (e.g., based on historical and ongoing evaluation of the factors' effectiveness), combinatorial logic, a neural net or fuzzy logic, etc. In some embodiments, the relying party incorporates the score into a risk-based decision system to be used in conjunction with other variables that, in various embodiments, include account history, user security preferences, other available factors such as device information or challenges, the monetary (e.g., dollar) value of a transaction, service policies, etc. The decision system then selects from a range of appropriate responses, which include at least one of blocking access, requesting additional authentication factors, permitting access, etc.

In some embodiments, if the user's device cannot be verified by the verification service, or if the verification score is insufficient, the verification service contacts the user's device via an SMS or other communication channel, as described above with respect to device enrollment. For example, if a user's phone characteristics change, then the verification service can validate the phone again by sending an SMS to the phone that is captured by the verification client (residing on the device) and returned via a network connection. The changes could include one or more of an operating system upgrade, a spoof attempt, an application update, a device fingerprint based on device configuration information, a hardware change, the expiration of a symmetric key (which may have a forced expiration date), etc. The changes to the characteristics of the device may be sufficiently different so as to trigger a re-enrollment of the phone. In some embodiments, the re-enrollment is triggered by the verification service.

In some embodiments, the relying party specifies, to the verification service, the score that is required to complete a verification. If the user's device verification score on a call is too low, in some embodiments, the verification service reconfirms the (observed) ANI by sending an SMS or other communication to the phone number that is intercepted, processed, and responded to via a second channel. In some embodiments, this process is used to reconfirm the ANI and is used to raise the verification score. By automatically responding to the SMS (that originated from the verification service) with information about the call that is currently in progress, the verification service verifies that the ANI is not being spoofed, as it is unlikely that a spoofer is able to fake the routing of calls to the true number. This verification can be used to raise the verification score.

In some embodiments, a process that runs at least some of the time on a phone or other communications device is used to confirm a phone call to a third party, such as the callee or a verification service provider, the latter of which is then configured to convey an assurance to the callee. In one embodiment, the process running on the device determines that an outgoing phone call is being placed or in progress. As one example, the call is initiated from the app by a user either selecting a phone number from a stored list or entering a number. As another example, the app captures the start of a phone call by at least one of subscribing to system events such as the start of a new phone call or the entry of a number, modifying or inserting code related to the placing of calls, reading the contents of buffers or registers, identifying the context by reviewing instructions in the instruction pipeline, and observing side-effects of a phone call being placed, such as the display of information relating to a phone call on the screen of the device.

In some embodiments, an entity (e.g., verification service) that is associated with a communications infrastructure or the callee, initiates a communication to the portion of the verification process running on the device, requesting a verification of the phone call. In this case, the processing includes using, for example, one of an app, a portion of the operating system of the device or a device driver, a library that is part of an app, part of firmware (e.g., in the modem processor), etc.

In some embodiments, when the verification process confirms that the phone is used to call the callee device that received the caller id associated with the caller, the verification process communicates and conveys information related to at least one of a request for the confirmation; data associated with the phone call being placed; and data stored on the phone, such as a symmetric key, which is also stored by an entity associated with the recipient of the confirmation communication.

As the confirmation data is received (e.g., by the verification service), it is verified against the information that was previously stored for the user's device at the verification service using, for example, the scoring described above. If the confirmation data is deemed correct (e.g., properly formatted, associated with the expected data, and received within the expected time frame, which is an example of a system parameter), then an assurance is produced and conveyed to the callee or a party associated with the callee.

If the confirmation data is not correct or cannot be verified (e.g., the user's phone number was never registered, the user purchased a new phone with the old number, or a fraudster is attempting to trick the system), the failure to confirm is then conveyed to the callee or a party associated with the callee. The caller is then provided a confirmation that the call has either been verified or not been verified by the verification service.

In some embodiments, verification success or verification failure is then conveyed in-band through at least one of the same channel (e.g., primary communication channel) or via another channel. For example, the verification result can be conveyed as an audio signal in a voice channel, as an additional SMS message inserted into the SMS stream, a visual indication on a user's smartphone, or as messages presented through a secure display on the user's smartphone. In one embodiment, synchronous communication such as a phone call is automatically disconnected, with, in some embodiments, an audio or visual termination indication presented if the information cannot be correctly verified. In some embodiments, the callee is informed of whether the verification failed because the call was either confirmed to be spoofed or confirmed not to be spoofed, and if the latter, the reason why, if available. For example, a call will be confirmed to be spoofed if the caller device responds to the verification service provider that there is no such call, or no ongoing call, in response to receiving a request to send the response. If the caller device does not support the verification service (e.g., because the device does not have installed the verification mechanism), then it is inconclusive as to whether the call is spoofed or not. Other indications can also be generated. For example, if the caller device does not respond, the reason may include one or more of the device being off the network (which is an indication that the call is spoofed), that there is a temporary device or software failure, or that there is a temporary network failure. In some embodiments, the verification service provider, in such a situation, attempts to make a connection for some number of times that is a system parameter, after which it outputs a notification to the callee indicating what took place, including what types of responses the device normally sends and what types of responses were received during a recent session.

In some embodiments, the software installed on a calling device conveys call information to an intermediary verification service through a separate channel (e.g., that is different from the primary channel used to make the call being verified). In this example, the service acts as a trusted third party to verify the validity of the call (e.g., based on data associated with the phone call being placed, data stored on the phone such as a symmetric key, device information, etc.) and to provide the verification information to the called party. In some embodiments, a verification result is sent to the called party through another channel or retrieved by the called party as needed. In some embodiments, the verification service provides only the results of the verification to the called party without exposing any device information, such as a symmetric key, to the called party. In some embodiments, a caller device is registered a single time with a verification service and is then able to use the verification service with many called parties.

In some embodiments, the caller device registers with multiple verification services, as different relying parties may use different instances of verification services. In some embodiments, in order to increase availability, the verification service is also replicated for high availability and high volume of calls.

In some embodiments, a called party or callee queries the verification service to verify the validity of a caller's device through a second communication channel when the called party or callee recognizes the incoming call identifier (e.g., caller ID or ANI). In response to the query, the verification service then sends the verification result to the callee before the call is even initiated, which allows the callee to perform operations before the call is received, such as looking up the user's account information, deciding how to route the incoming call, or deciding what authentication, if any, should be used to further verify the validity of the caller.

In some embodiments, a verification service evaluates the quality of the data provided by the callee's device to create a score. In one example embodiment, the data score is combined with the age of the data to provide an overall quality score to the callee. In some embodiments, the verification service provides the call start time and/or device information for the relying party to evaluate.

In some embodiments, input from a relying party provides feedback on a particular phone call that indicates a problem with the user's device, such as a stolen device, possible spoof attempt, fraud related to a device, or a verification that subsequently proved to be errant. This information can then be incorporated into an overall reputation score of a caller's device.

In some embodiments, the relying party provides its own verification service rather than using a third party service.

In some embodiments, the device is a smartphone with both a phone channel and a 3G/4G network channel. Other examples of devices include a smartphone, tablet, PC, phablet, or wearable computer with a processor and multiple communication channels or a single channel that is multiplexed across two different endpoints.

In some embodiments, the app installed on a device is enrolled when the user starts the app for the first time. When the app is started, the app automatically places a phone call to a phone number (e.g., that is embedded in the app) that is used for enrollment by the verification service. The corresponding verification service that is contacted captures the incoming ANI or caller ID of the phone and sends an SMS back to the phone containing a unique temporary identifier. The identifier is used as a secret key or is used to compute a secret key. For example, a method such as Diffie-Hellman key exchange or RSA key transport can be used, where a public key associated with the verification service is embedded in the app, and is used to compute the encrypted key that is generated by the device and communicated (e.g., in an encrypted manner) to the verification service. This communication can, for example, be sent using SMS or a regular Internet connection. In some embodiments, the user device stores the derived or generated secret key, and a storage associated with the verification service also stores the secret key. In some embodiments, the secret identifier or symmetric key is used to validate the device in future communications in some embodiments.

In some embodiments, once the phone is enrolled with a secret unique identifier, a call to a relying party is initiated in response, for example, to a user selecting a number from a pre-populated list or entering a new number from within the app. The app places the call to the relying party and securely conveys information about the call to a verification service via a message encrypted with the symmetric key, as discussed above, on a communication channel that includes one or more of 3G/4G networks, WiFi, Bluetooth, or any other appropriate channel/network. The relying party then captures the ANI data from the inbound call and queries the verification service about the call. The verification service then compares the information from the app with the request from the relying party and returns a verification result.

In one embodiment of the enrollment process, the initial communication path used by the device to contact a verification service includes channels such email and SMS, instead of a phone call. In such a scenario, the verification service does not verify the ANI of the device, and instead verifies the corresponding communication identifiers associated with the initial communication path.

In another embodiment, the initial enrollment of a device by a relying party or the verification service, as well as occasional re-enrollments sessions, are combined with one or more additional authentication tools including PIN verification, password verification, Knowledge Based Authentication, geolocation information, or verification tools such as Name+Address+Phone checks or credit card information validation. Such additional authentication can also be combined with an ANI verification session, as described herein. Additional authentication and verification can also be used for additional user validation. This provides additional assurance features not only for the sessions where the additional authentication is used, but for other sessions as well. This is because the combined use, in a single session, of the extra authentication and the verification of the device specific identifier (e.g., such as that associated with caller id) allows the mechanisms to become associated with each other. Thus, a verification service can determine, with reasonable assurance/certainty that each session in which a given ANI is verified corresponds to a user with certain knowledge, access rights, or other authenticator.

In some embodiments, a security verification token received on the second channel is then returned via the first channel. For example, if a call is placed to the verification service, the service can contact the user's phone via another channel and provide a unique value. The unique value is then inserted into the phone call, for example, as a barely audible audio tone or an explicit voice to text reading out a number. The verification service can then decode the audio to match against the unique value.

In some embodiments, a relying party generates the unique value and sends it directly to the caller's phone on a second channel, where it is intercepted and then inserted into the phone call on the first channel (e.g., as a barely audible audio tone or an explicit voice to text reading out a number). In one example implementation, the relying party software detects the unique value through an automated system such as tone detection. The unique value is then compared with the ANI information from the phone call. If there is not a match, then it is determined that the ANI information is spoofed or is not representative of the caller device.

In some embodiments, when phone calls are directed to another number using call forwarding, the verification service determines, by sending an SMS or push notification, that the user's calls are not being received at the ANI that originated the call. In such a scenario, the result will be determined to be one or more of no response, correct device information but no call information from the forwarded phone, or incorrect device information from the forwarded phone. The verification service then provides the resulting status to the relying party, which determines how to interpret the result based on its policies.

In some embodiments, the verification functionality discussed above is implemented at the operating system level (e.g., of the phone), but the implementation may alternatively be at one or more of the application level, as a library that multiple applications can use, or a combination of operating system, application level, and libraries.

In some embodiments the ANI verification is used to enable automated password reset through an interactive voice response (IVR) system for users that forget their password. For example, when the IVR system is called by the user, the ANI is recognized and validated by the verification system. The IVR system can then, for example, create a new temporary password, send an email with half of the password, e.g., the word "brave," and indicate to the user, via audio or SMS, the other half of the password, e.g., "8317." The user would then combine the parts for the full temporary password, "brave8317," that can be used to log into the user's account instead of the password that the user forgot.

In some embodiments, if the user's phone is not previously enrolled with the verification service, the verification service can call the user's phone to verify that a call is in progress. As one example, when the user's phone is not previously enrolled with the verification service, the verification service can send an SMS with a unique identifier to the phone and request the user of the phone to respond via SMS. For example an SMS is sent to a user's device with the phrase "purple cow." The user can then manually return the same phrase in a reply SMS on the second channel, or "purple cow" can be inserted into the audio stream on the first channel. The verification service recognizes that the correct phrase has returned through a round trip, which confirms that the ANI is valid (as it may be difficult to spoof a phone network to receive the SMS message at a different phone number). In one example implementation, a verification process running on a phone that has not been enrolled with a verification service intercepts an incoming SMS or push notification, captures the phrase, and inserts it into the first channel as audio using text to speech. In another example implementation, a verification process running on the phone is configured to intercept the incoming SMS or push notification, capture the phrase, and automatically respond on another channel such as a 3G/4G network.

In various embodiments, typically unconventional channels can be used to communicate messages and responses to messages. For example, a user device can send such information by spoofing ANI data, where, instead of using the regular ANI of the device, the spoofed ANI is used to convey/encode the messages/responses to the messages without the use of a separate physical channel. Similarly, error messages, communication protocol messages, and other low-level messages can be used to convey information between the user device, the verifying party, the relying party, and the callee device.

In some embodiments, once the app on the user's phone is enrolled with the verification service and connected to an account at the relying party, the app can modify one or more of the caller ID or ANI to encode information about the incoming call. For example, the user's phone number can be combined with a one time code that is generated by the app based, for example, on the symmetric key and the current time. When the relying party observes the incoming ANI and Caller ID, it decodes the one time code based on the symmetric key for the account associated with the user and validates the timestamp. In one example implementation, the app can be populated with a list of "one time pad" codes for the account that are known only to the app and the relying party; or a function to compute the codes from a shared secret. When the one time code is received (e.g., encoded in the Caller ID or ANI and extracted by the relying party), the relying party can uniquely identify the account associated with the user/device and mark the code as used, for example, by comparing the observed ANI to one or more potential onetime codes associated with one or more accounts. A match that is made is used as evidence of the identity of the device. Using such functionality also serves to hide the ANI to callers who do not have the shared secret, thereby providing user privacy at the same time as providing assurance of the identity of the calling device.

In some embodiments, once the user's phone is enrolled with the verification service and connected to an account at a relying party, the user's phone can be used to authenticate the user when accessing the account from a different device. For example, suppose that the user enters an account identifier into a web browser on a PC. The relying party can contact the verification service, which in turn contacts the user's phone via SMS or a push notification, for example, to ask the user to confirm the account access. In some embodiments, the confirmation is one or more of a confirmation of a financial transaction or an agreement.

Figure 2A:
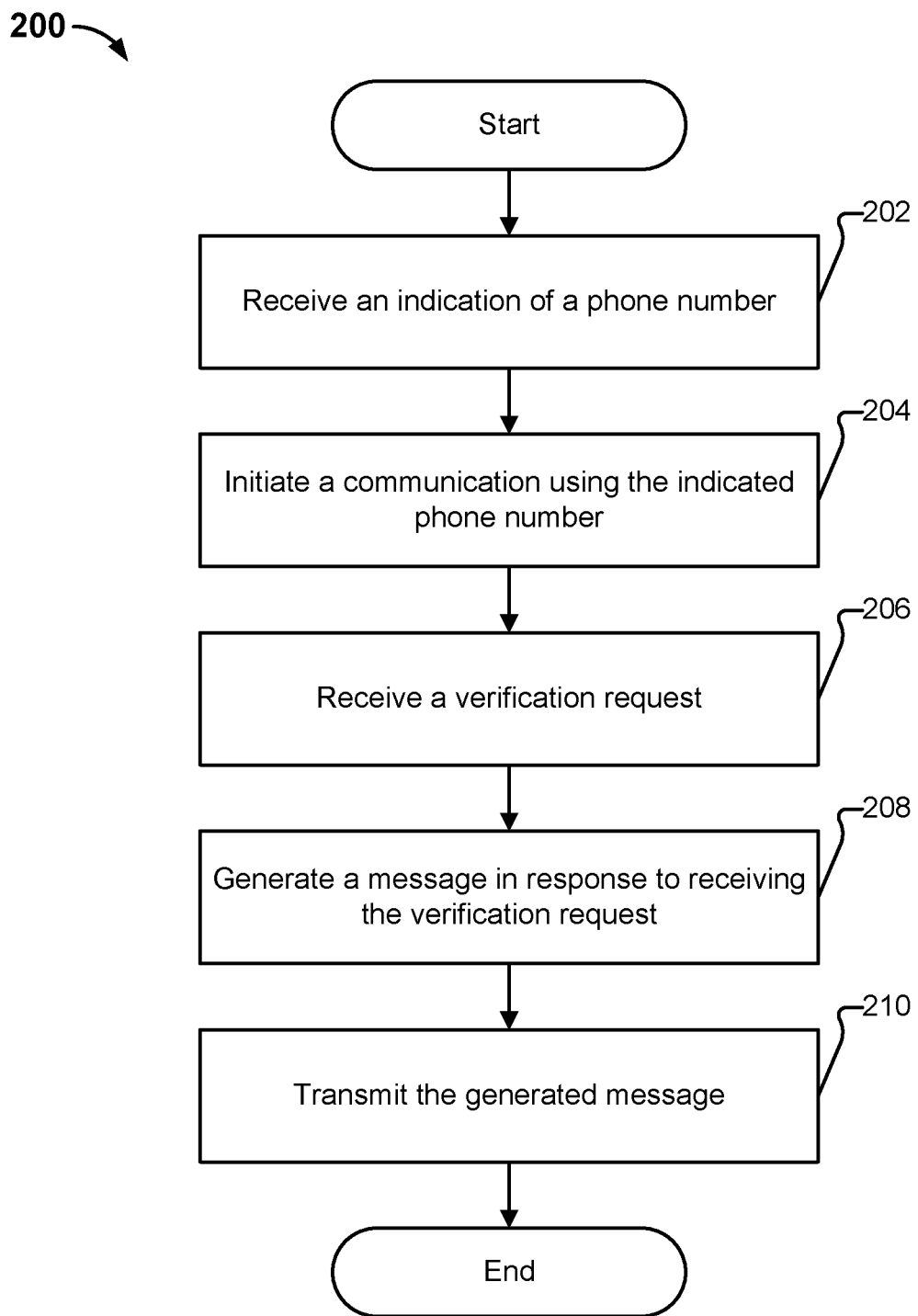
FIG. 2A illustrates an embodiment of a process for verifying caller identification information.

FIG. 2A illustrates an embodiment of a process for verifying caller identification information. In some embodiments, process 200 is executed using telephonic device 102 of FIG. 1. The process begins at 202 when an indication of a phone number to be called is received. As one example, the phone number is entered by a user of the phone. As another example, the phone is selected from a list of phone numbers.

At 204, contact with the callee is initiated using the indicated phone number. As one example, either a call or SMS is initiated to a callee/relying party. In some embodiments, the callee, while receiving the call, observes the ANI or caller ID information on the call, and makes a request to the verification service provider to verify the call (e.g., to determine whether the observed ANI data is spoofed).

At 206, a verification request is received. For example, in some embodiments, in response to receiving a request from the callee entity to verify the call that is in progress, the verification service provider sends, to the device, a verification request. For example, in order to verify the ANI data or caller ID observed by the callee, the verification service provider sends a message using the observed ANI data or caller ID. If the observed phone number (indicated by ANI data or caller ID) has not been spoofed, then the device used to initiate the call to the callee will also receive the verification request.

In some embodiments, as described above, the channel that is used for the verification service request to the calling device is different from the initial, primary communication channel used by the calling device to make the call (e.g., a separate, different backchannel is used to make the verification service request). For example, while the phone call is made using an audio channel, the verification request may be made using SMS.

In other embodiments, the same channel as the primary communications channel is used to make the verification request. In some embodiments, if the same channel is used, then the verification request is encoded in the channel in a manner that is not noticeable to an end-user of the calling device. For example, if an audio call has been initiated, the verification request can be encoded as barely audible signals that are decoded by the device.

At 208, a response message is generated. For example, suppose that an SMS is received from the verification service provider. In response to the verification request, a message is generated that includes information used to verify the call made to the callee. For example, the response to the verification service provider can include information about the phone call being made, such as the start time of the call, device information, or a secret value or unique identifier that is known only by the device and the verification service provider. As another example, the information includes computed values that are computed, for example, using keys or codes that are known only to the device and verification provider. In some embodiments, the device hides the verification messages such that these are not displayed or otherwise made presentable to the user of the calling device.

At 210, the generated message is transmitted, for example, to the verification service provider. In some embodiments, the verification service provider validates the information and makes a security determination based on the validation. The security determination is then passed to the relying party. Upon receiving the security determination, the relying party makes a security decision as to whether the observed phone number (ANI data or Caller ID) is verified to be correct. If the number is verified, then the relying party determines that the authentication is successful, otherwise the authentication is rejected. The relying party can take various actions based on the verification result, as described above.

Various channels can be used to transmit the generated message. For example, in some embodiments, the generated message is transmitted using the second communication channel that was initiated by the verification service provider. As another example, the generated message is transmitted using the primary communication channel initiated between the caller device and the callee.

In some embodiments, the security determination (or any other appropriate information) is passed to the relying party automatically. In some embodiments, the security determination is provided in response to a query by the relying party. For example, because different channels may be used for the initial call, the verification request, and the response message, delays may occur in the verification service provider being able to provide security determination information to the relying party. In such a scenario, in some embodiments, the relying party is configured to query or poll the verification service provider for security determination information (e.g., periodically until the information is available, after a delay, etc.).

In some embodiments, the information is sent to the verification service provider at the time that the call is initiated, without being prompted by the verification service provider (e.g., the calling device initiates contact with the verification service provider). For example, the calling device includes an app that is configured to recognize that a call has been initiated, and automatically sends information about the call (e.g., start time, enrolled key, etc.) to the verification service provider. The verification service provider can then, for example, provide a security determination to a relying party (either by proactively sending the security determination to the relying party, or providing the security determination when it is requested by the relying party).

Figure 2B:
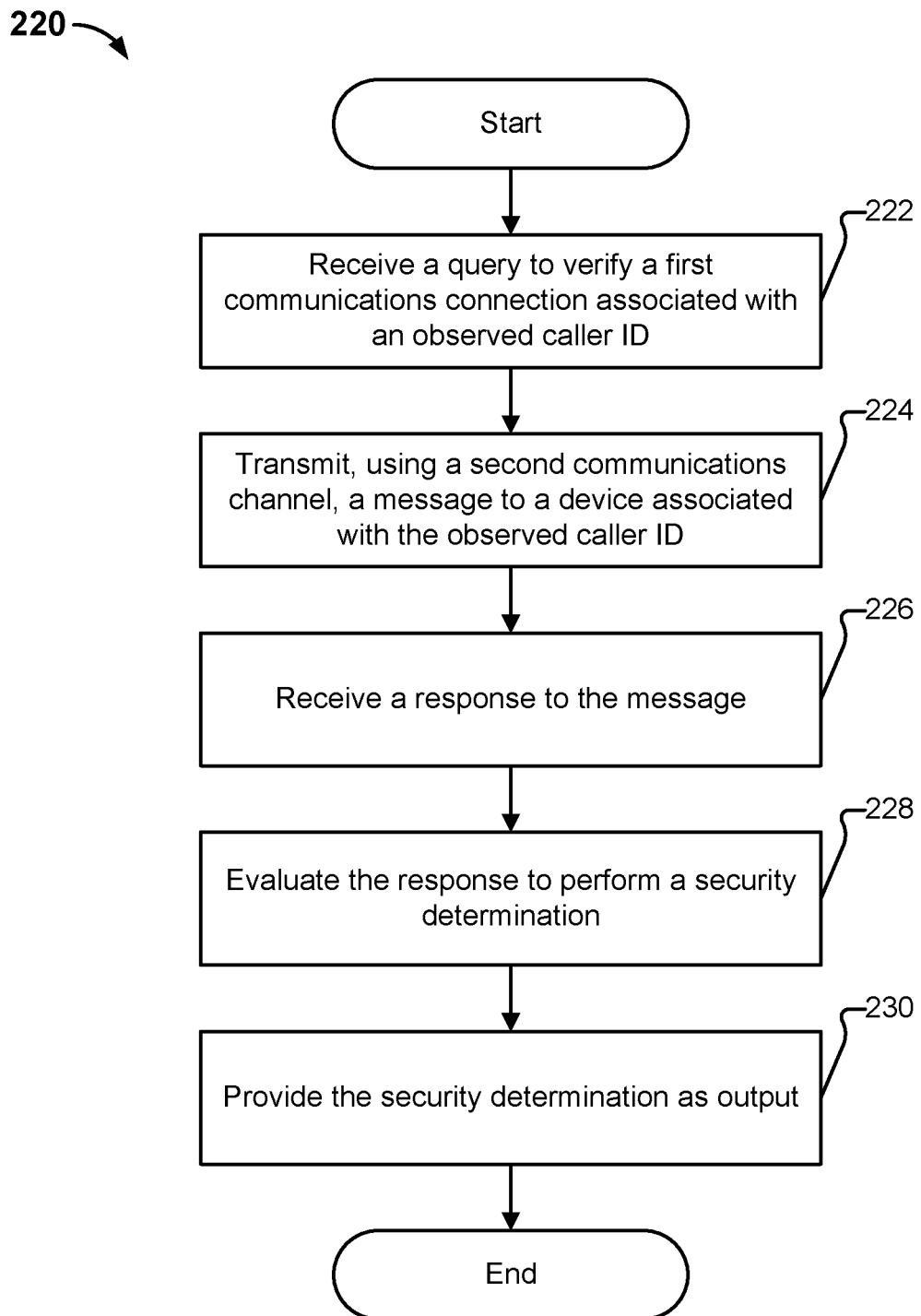
FIG. 2B illustrates an embodiment of a process for verification of caller identification information.

FIG. 2B illustrates an embodiment of a process for verification of caller identification information. In some embodiments, process 220 is executed by verification service provider 120 and/or relying party 118 of FIG. 1. The process begins at 222 when a query to verify a first communications connection involving a first entity is received, the first communications connection/channel associated with an observed caller ID of a contacting entity. For example, suppose that a callee receives a phone call purporting to be from an observed caller ID/ANI. In order to determine whether the number has been spoofed, the callee contacts the verification service provider to validate the ANI/caller ID.

At 224, a message is transmitted to a device associated with the observed ANI using a second communications channel. For example, in some embodiments, as described above, a back channel is initiated by the verification service provider to communicate with a device associated with the observed ANI. In some embodiments, the message includes information that is difficult for a spoofing attacker to predict, such as a serial number, a counter, a pseudo-random or random number, a number specific to a particular session or device, etc. In some embodiments, the second communications channel is a backchannel that is different from the first communications connection/channel. In other embodiments, the second communications channel is a backchannel that is encoded in the first communications channel.

At 226, a response to the message is received. For example, a device such as phone 102 of FIG. 1 captures the message and in reply, sends a message that makes a reference to at least a portion of the message sent by the verification services provider. In some embodiments, the response is received by the verification service provider directly from the device. In other embodiments, the response is received via another entity (e.g., the entity that was called and that requested the verification, as described above).

At 228, the response is evaluated to perform a security determination. For example, in some embodiments, it is verified whether the response corresponds to the transmitted message. If so, as described above, then a positive security determination is made. If an invalid response is received, or no response at all is received, for example, within a threshold amount of time, then a negative security determination is made. At 230, the security determination is provided to the first entity, which performs a decision based on the security determination (e.g., whether to authenticate the first communications connection).

Figure 3A:
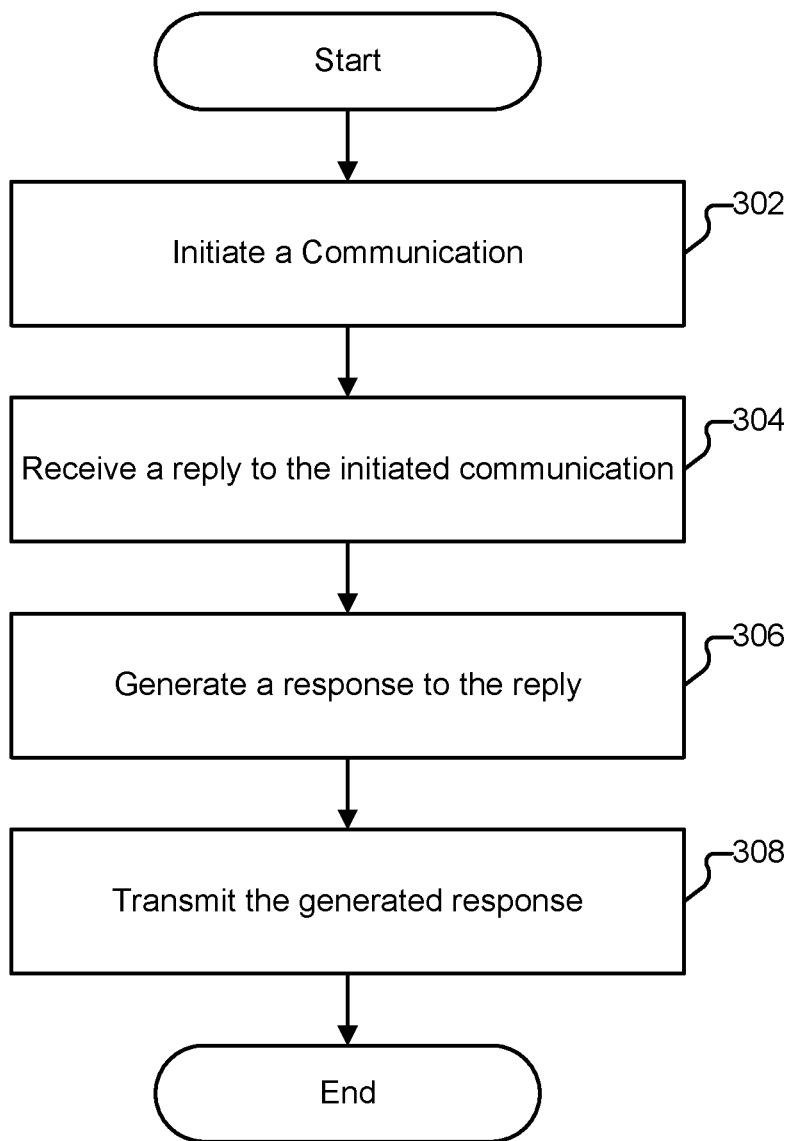
FIG. 3A illustrates an embodiment of a process for enrolling a device.

FIG. 3A illustrates an embodiment of a process for enrolling a device. In some embodiments, process 300 is executed by phone 102 of FIG. 1. The process begins at 302, when an application, such as an "app" described above, installed on the device communicates with a verification service provider. For example, the application either initiates a call or sends an SMS to the phone number for the verification service provider. As described above, in some embodiments, the number is known to the application installed on the device.

At 304, a response to the initial communication is received. For example, in some embodiments, the verification service provider returns the call or SMS with a call or SMS using, for example, a one-time passcode (OTP) as the verification service provider's caller ID, as described above. In some embodiments, the device processes the response, for example, capturing the caller ID that includes the OTP sent by the verification service provider.

At 306, a response is generated. For example, in response to the verification service provider's reply, the device is configured to generate and send back a set of information to the verification service provider. One example of information included in the set is device information. Another example of information included in the set is a unique ID. In some embodiments, the unique ID is computed dynamically and the device stores it locally for future communications with the verification service provider. Another example of information included in the set is the OTP value previously sent by the verification service provider. In some embodiments, sending back the previously transmitted OTP value allows the verification service provider to verify the phone number of the device (i.e., because the enrolling app sends back the OTP that was sent by the verification service provider to a particular phone number, proof is established that the app being enrolled is installed at a device with that particular phone number to which the OTP was sent). The verification service provider validates the OTP value and stores any device information and/or unique identifiers sent by the device. At 308, the generated response is transmitted, for example, to the verification service provider via a network connection.

Figure 3B:
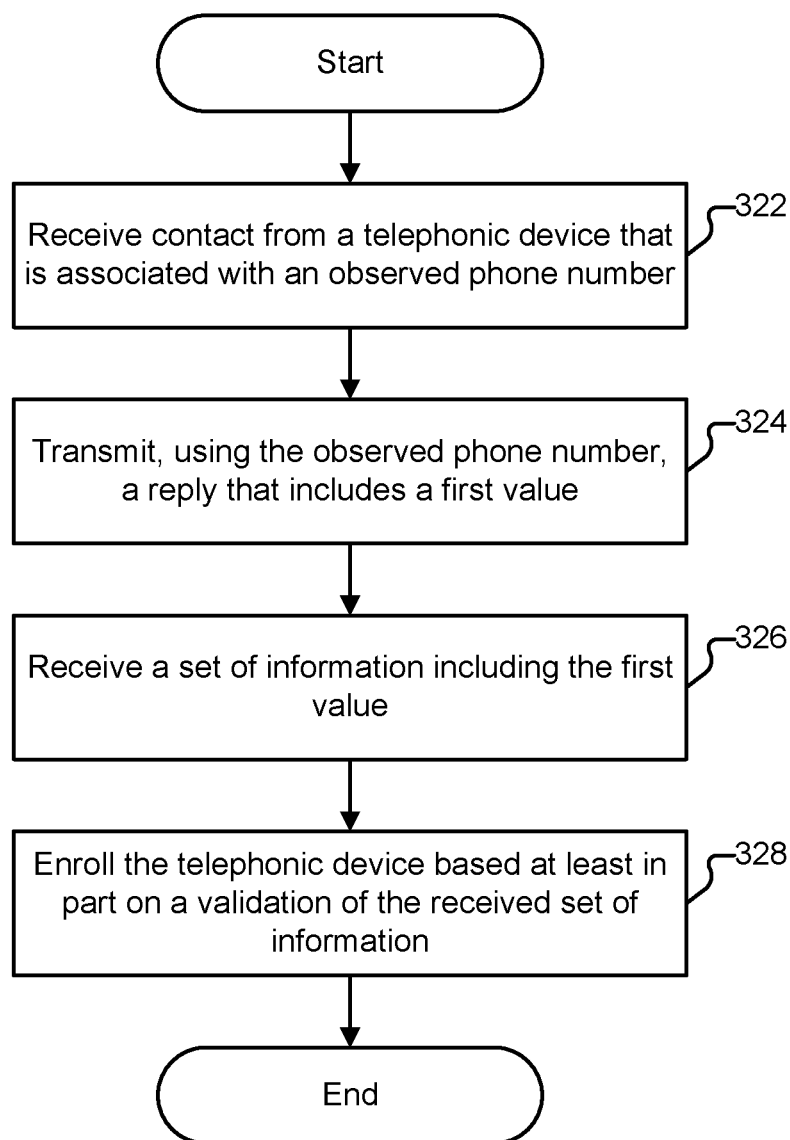
FIG. 3B illustrates an embodiment of a process for enrolling a device.

FIG. 3B illustrates an embodiment of a process for enrolling a device. In some embodiments, process 320 is executed by verification service provider 120 and/or relying party 118 of FIG. 1. The process begins at 322, when contact is received from a telephonic device associated with an observed phone number. For example, when a user uses a banking app installed on their smartphone for the first time, the app automatically calls a known verification service provider. At 324, a reply to the contact that includes a first value is transmitted using the observed phone number. For example, in response to receiving the call from the app on the smartphone, the verification service provider sends an SMS reply including a one-time passcode (OTP). At 326, a set of information is received. For example, the verification service provider receives, from a device associated with the observed phone number/caller ID/ANI, a response that includes a set of information. For example, the app installed on the phone, in response to receiving the message from the verification service provider, sends back the OTP value that was sent, as well as device information and a unique identifier. At 328, the received set of information is validated. For example, if the received information includes the previously sent OTP value, then the verification service provider verifies that the app is installed on a device that has the phone number that was observed in the original contact. If the information is validated, the device/app is then enrolled. For example, any device information or unique identifiers sent by the device/app are stored (e.g., in a user record of the bank with which the app is associated).

Additional Examples

FIGS. 4-14 illustrate example environments in which enrollment of a device and verification of automatic number information data (e.g., caller id) is performed.

Figure 4:
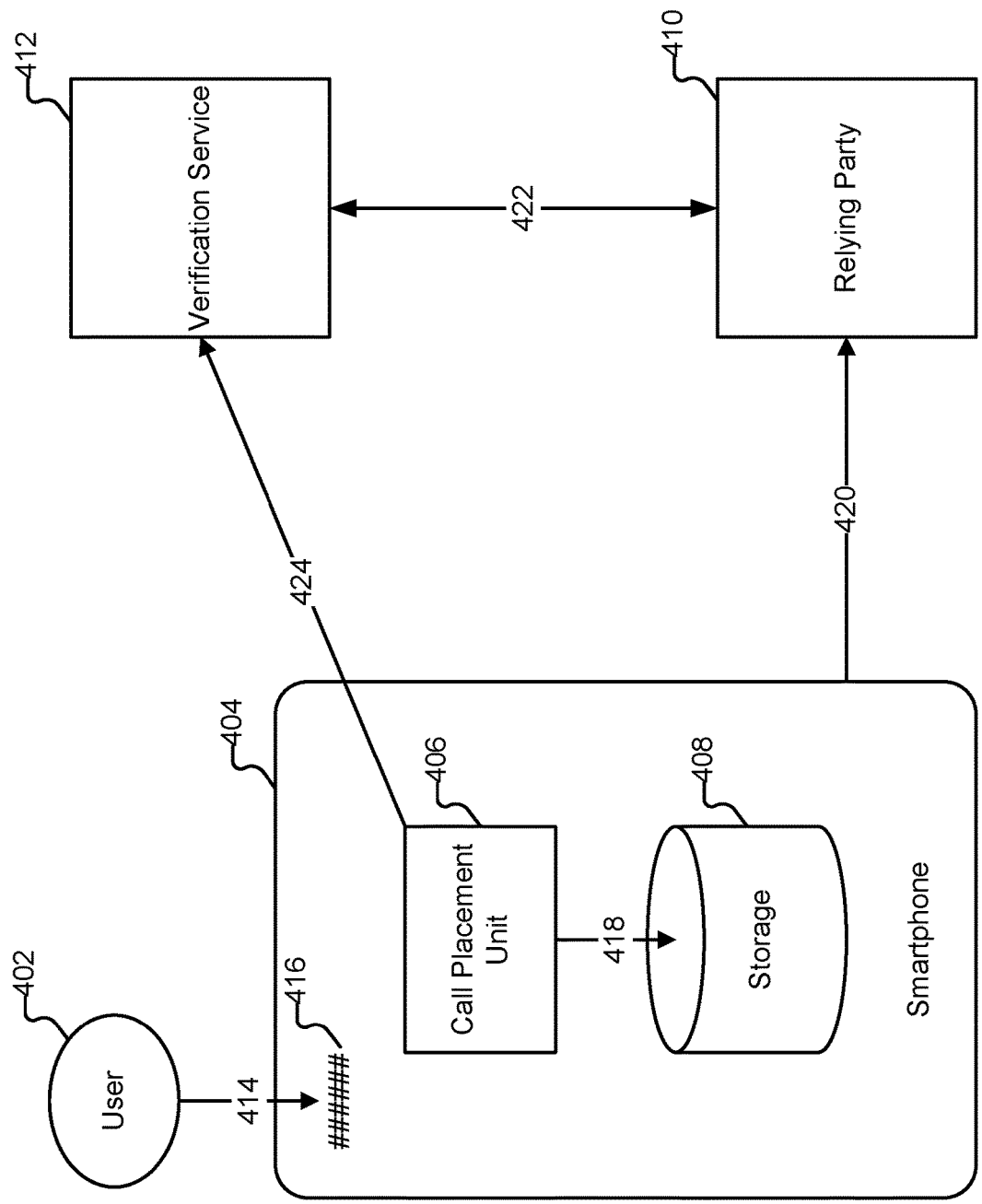
FIG. 4 illustrates an example of an environment in which verification of caller identification information is performed.

FIG. 4 illustrates an example of an environment in which verification of caller identification information is performed. In this example, a user 402 enters, at 414, a phone number (416) into a smartphone device 404 or selects a number 416 that is already stored on the smartphone to place a call or send an SMS to a relying party 410 (i.e., callee). In some embodiments, relying party 410 is an example of callee 118 of FIG. 1. In this example, call placement unit 406, which, in some embodiments, is an example of call placement unit 108 of FIG. 1, captures the entry or selection of the phone number 416. In some embodiments, call placement unit 406 checks, at 418, the phone number 416 against a list of monitored phone numbers stored in data storage 408. If the phone number 416 is found in storage 408, information about the call is sent, at 424, to verification service 412, which, in some embodiments, is an example of verification service provider 120 of FIG. 1. In some embodiments, check 418 is not performed against storage 408 and all phone numbers are sent to the verification service 412. When the relying party 410 receives the call, SMS, or push notification (420), the relying party 410 can detect the incoming phone number 416 and query, at 422, the verification service 412 to verify the incoming call. One example of communication 422 between the verification service 412 and the relying party 410 is a secure internet connection. In other embodiments, the communication channel includes one or more of Wi-Fi, 3G/4G network, Bluetooth, audio, SMS, phone call, RDMA, interprocess communication within the same system, or any other communication channel.

Figure 5:
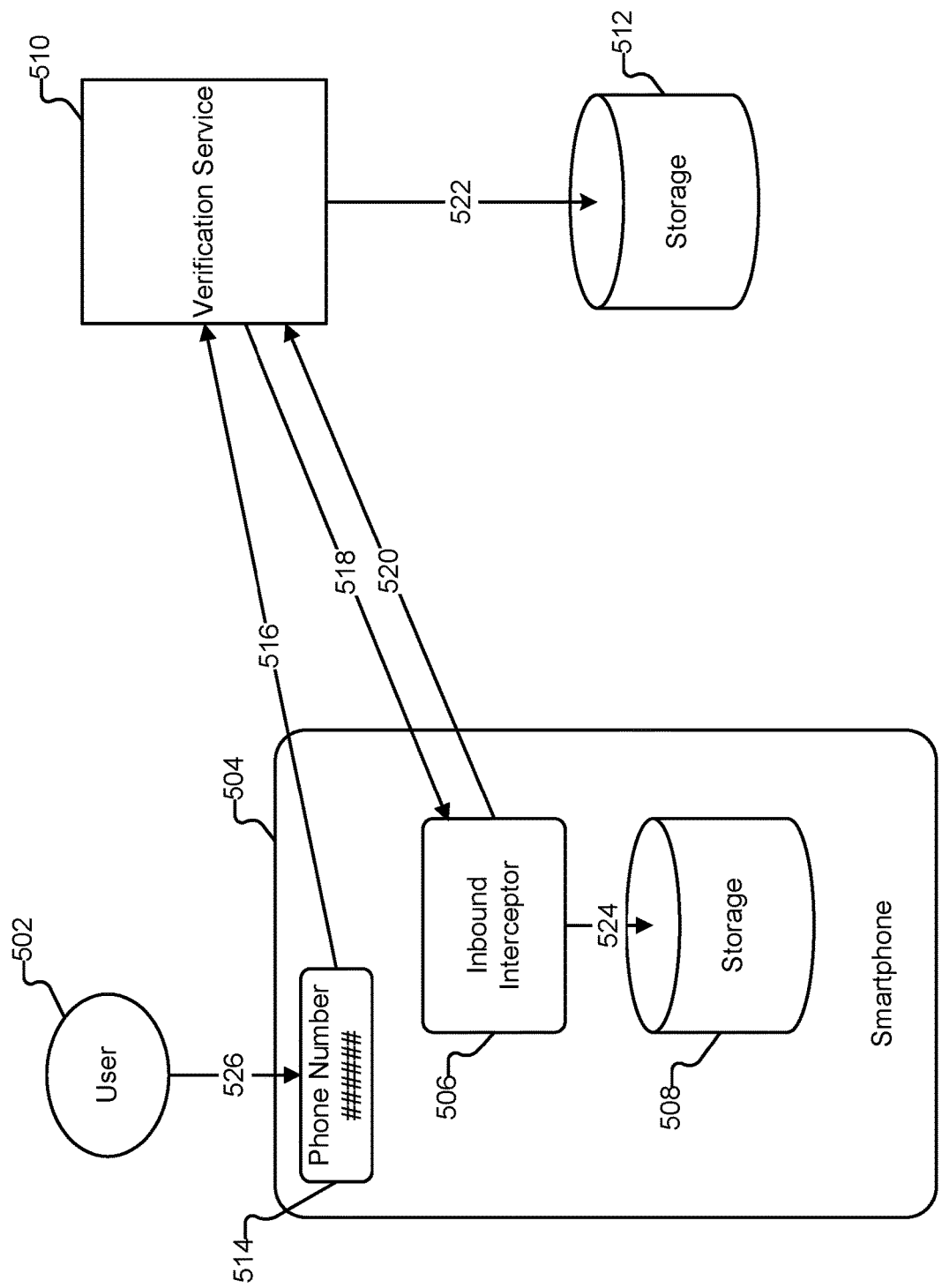
FIG. 5 illustrates an example of an environment in which enrollment of a device is performed.

FIG. 5 illustrates an example of an environment in which enrollment of a device is performed. In this example, user 502 connects their smartphone device 504 with verification service 510, which, in some embodiments, is an example of verification service provider 120 of FIG. 1. In some embodiments, a default phone number (514) is provided. In other embodiments, user 502 enters (526) a phone number for another verification service. In this example, the number is called, or an SMS is sent, at 516, to verification service 510.

Verification service 510 captures the inbound phone number and returns (518) either a call or an SMS to the same number to verify the number. Inbound interceptor 506, which, in some embodiments, is a portion of a communications unit such as communication unit 104 of FIG. 1, recognizes the return call from the verification service 510 and initiates a network connection (520) to deliver a unique device identifier that is then stored (522) into local storage 512 by the verification service 510. The unique identifier is also stored locally at the smartphone device, at 524, into data storage 508 on smartphone device 504 for subsequent communication with the verification service. Once connected to the verification service, the smartphone device 504 can be used with each relying party or callee (e.g., relying party 410 of FIG. 4) that uses the verification service with no additional enrollment steps.

Figure 6:
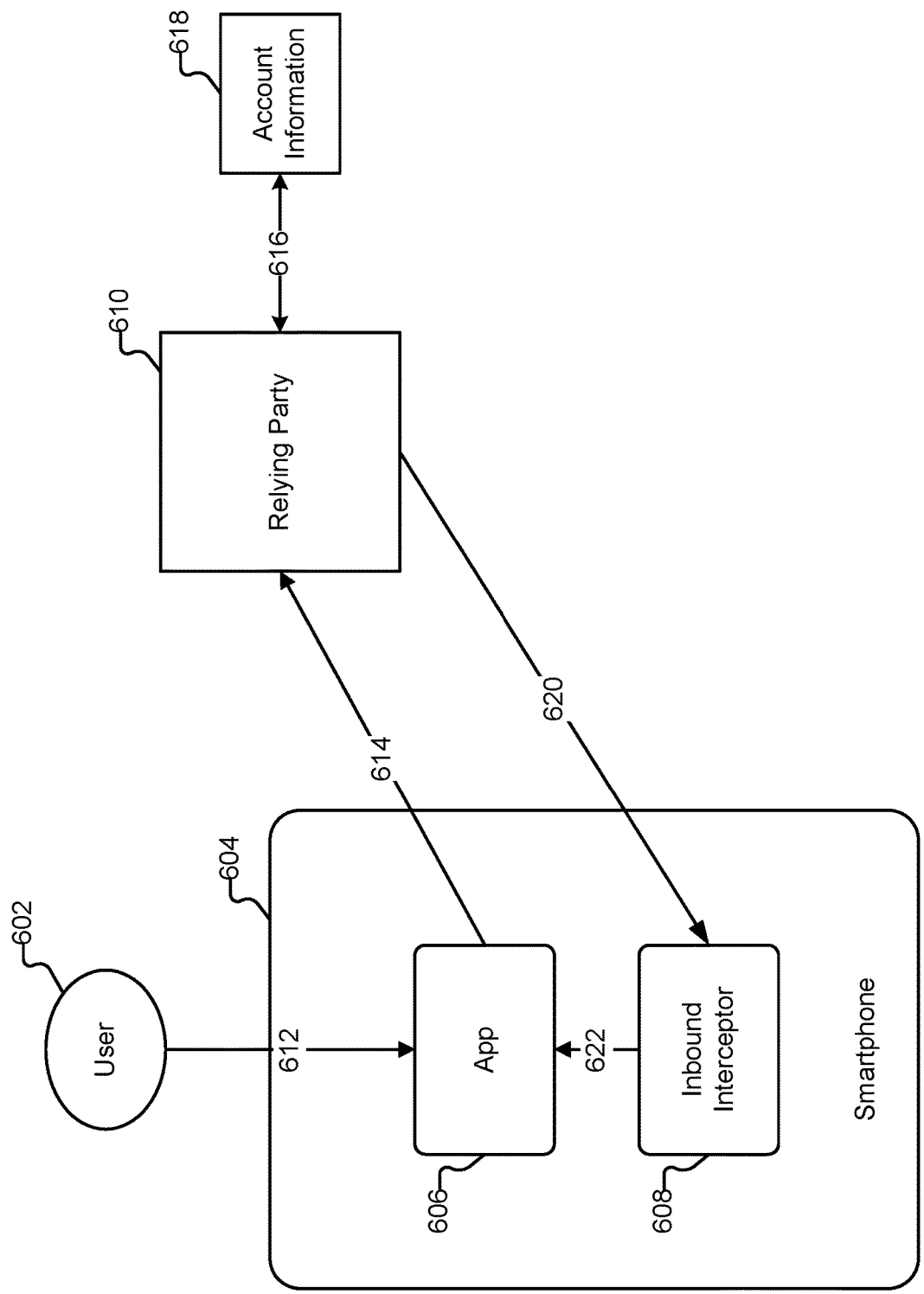
FIG. 6 illustrates an example of an environment in which verification of caller identification information is performed.

FIG. 6 illustrates an example of an environment in which verification of caller identification information is performed. In this example, verification using an application installed on a smartphone device (also referred to herein as an "app") is described. In this example, a user 602 starts, at 612, an app 606 installed on a smartphone 604. In this example, the app is configured to connect, using connection 614, to the relying party 610 with an account identifier. The relying party 610 performs a look up (616) of the associated phone number in account information 618. If the phone number is not found in the account information 618 or is not current, in some embodiments, the app 606 prompts the user 602 to enter the number.

In the example shown, the relying party generates a unique one time passcode (OTP) and sends the OTP as the caller id or ANI via a phone call or SMS (620) to the user's smartphone 604. Inbound interceptor 608, which in some embodiments, is an example of a portion of a communications unit such as communication unit 104 in FIG. 1, captures the caller id of the inbound call or SMS and passes it, at 622, to app 606. App 606 relays the unique identifier to relying party 610 via the already established connection 614, to confirm that app 606 is running on the smartphone 604 that matches the account phone number in the account information 618. In some embodiments, the app can generate a second unique value and pass it with the OTP via the established connection 614, and the relying party 610 can store this second unique value with the user's account information 618 to use as a secret device identifier for the account. In some embodiments, the value is used later as a seed for encrypted communication between the smartphone 604 and the relying party 610.

Figure 7:
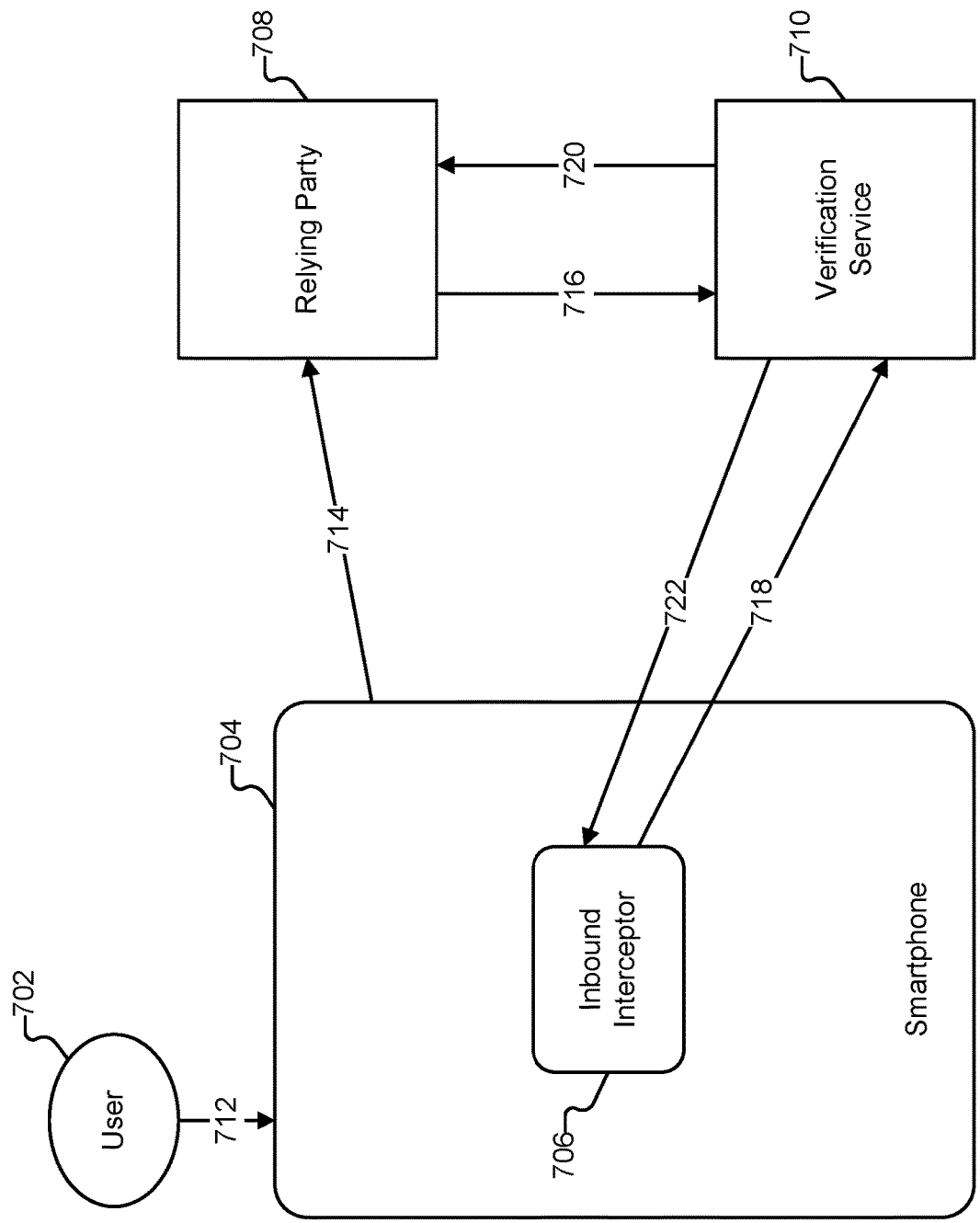
FIG. 7 illustrates an example of an environment in which verification of caller identification information is performed.

FIG. 7 illustrates an example of an environment in which verification of caller identification information is performed. In this example, a user 702 uses, at 712, a smartphone 704 to make a phone call (714) to a relying party 708 (also referred to herein as the "callee"). Relying party 708 passes, at 716, the user's phone number to verification service 710. In this example, verification service 710 sends an SMS message, at 722, to smartphone device 704. Inbound interceptor 706, which is an example of a portion of a communication unit such as communication unit 104 of FIG. 1, captures the incoming SMS and recognizes that the message is from verification service 710. Inbound interceptor 706 then replies, at 718, with the device information and information about the call in progress. In this example, the reply 718 is sent via a 3G/4G network, WiFi, SMS, or any other appropriate network. The verification service 710 then validates the device and call information and provides a validation result (720) to relying party 708.

Figure 8:
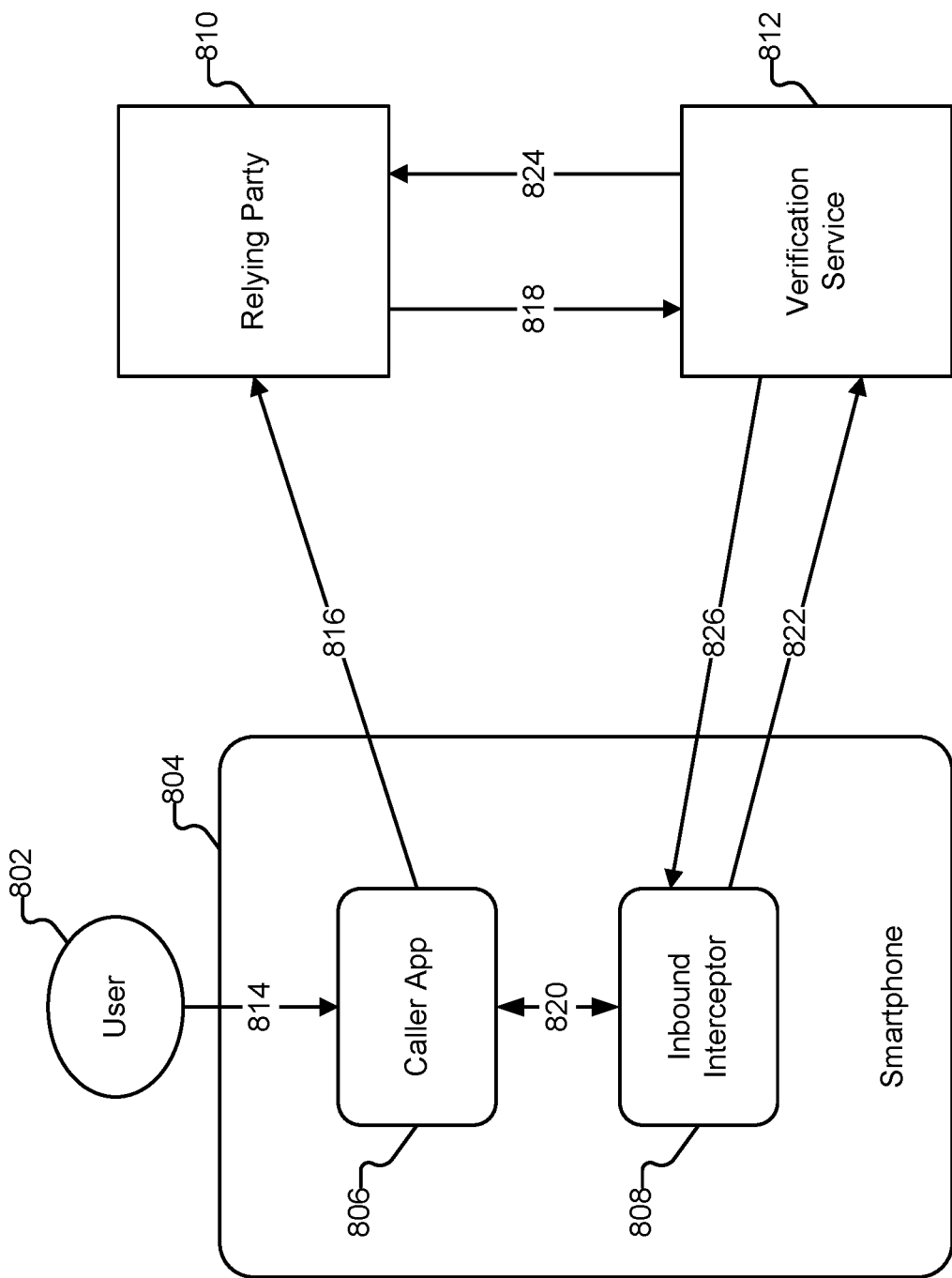
FIG. 8 illustrates an example of an environment in which verification of caller identification information is performed.

FIG. 8 illustrates an example of an environment in which verification of caller identification information is performed. In this example, a user 802 starts, at 814, an app (806) installed on a smartphone device 804 in order to make a phone call (816) to a relying party 810 (also referred to herein as the "callee"). The relying party 810 passes, at 818, the user's phone number (e.g., obtained from caller id/ANI data) to verification service 812. In this example, the verification service then sends an SMS message (826) to smartphone device 804.

Inbound Interceptor 808, which in some embodiments is an example of a portion of a communication unit such as communication unit 104 of FIG. 1, captures the incoming SMS and recognizes the message is from verification service 812. Inbound interceptor 808 can query (820) the caller app 806 to verify the current call number and status. Interceptor 808 replies, at 822, to the verification service, with the device information and information about the call in progress. In various embodiments, reply 822 is sent via a channel that includes one or more of a 3G/4G network, WiFi, SMS, or any other appropriate communication channel. The verification service then validates the device and call information and provides a validation result (824) to the relying party.

Figure 9:
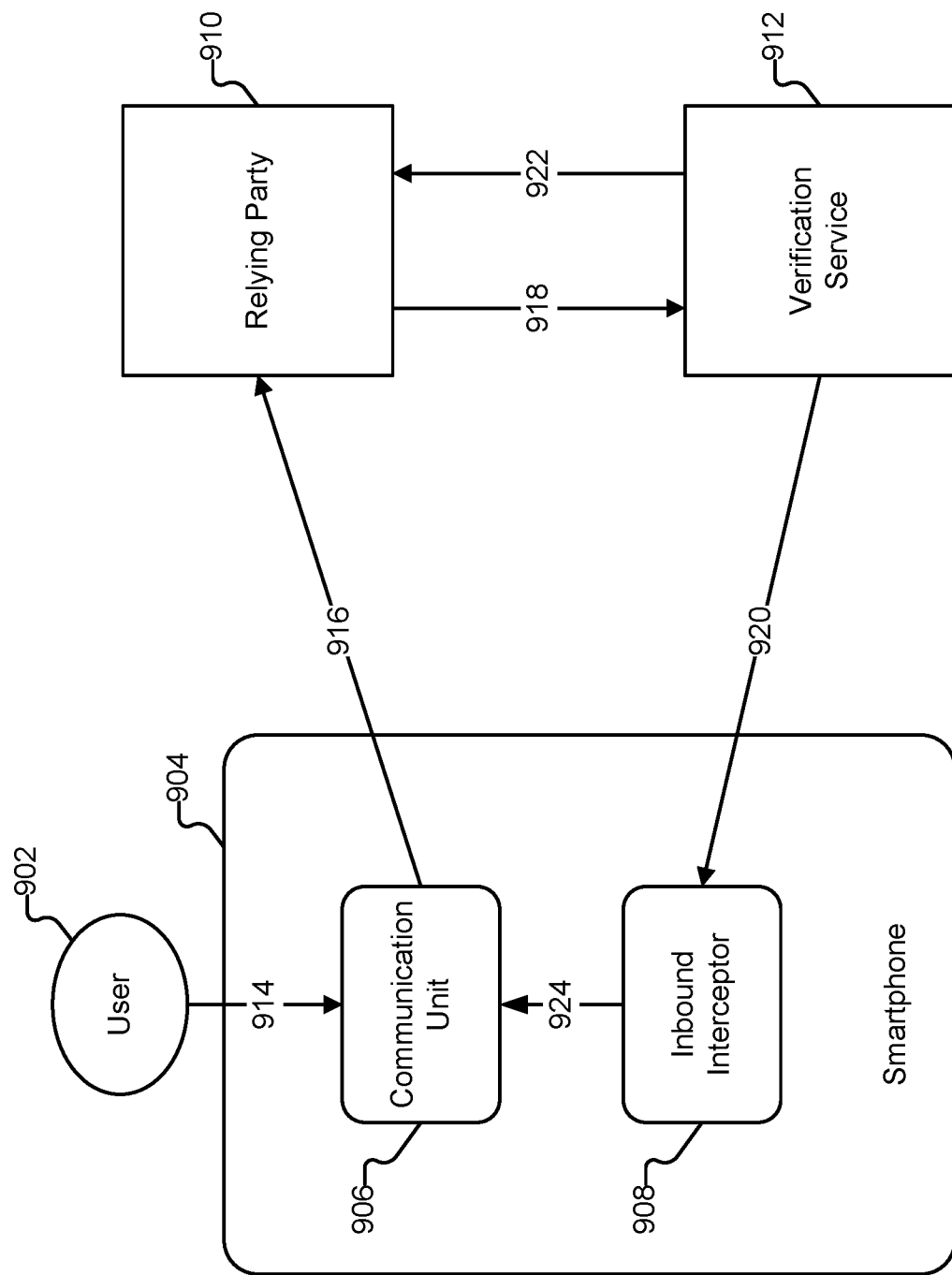
FIG. 9 illustrates an example of an environment in which verification of caller identification information is performed.

FIG. 9 illustrates an example of an environment in which verification of caller identification information is performed. In the example shown, a user (902) starts/initiates a phone call at 914 through communication unit 906. In various embodiments, communication unit 906 is one or more of a communication unit such as communication unit 104 of FIG. 1 and an app, such as app 806 of FIG. 8, that are installed on smartphone device 904 and used to make a phone call (916) to relying party 910 (also referred to herein as the "callee").

In the example shown, relying party 910 passes, at 918, the user's phone number (the phone number indicated via caller id or ANI data that is observed by the relying party) to verification service 912. The verification service sends, at 920, an SMS message or other communication with a unique identifier to smartphone device 904. In various embodiments, the unique identifier includes one or more of a number, phrase, tone, or any other appropriate unique identifier.

Inbound interceptor 908, which in some embodiments, is an example of a portion of a communication unit such as communication unit 104 of FIG. 1, captures the incoming message (920) and recognizes that the message is from verification service 912. The inbound interceptor extracts the unique identifier from message 920 and passes it (924) to communication unit 906.

In this example, the communication unit 906 inserts the unique identifier into the already open communication channel 916 to the relying party. In one embodiment, if communication channel 916 is an audio call, the unique identifier is then converted into a tone or spoken phrase (e.g., using text to speech) that is inserted into the audio call. The relying party 910 can capture the unique identifier and pass it to the verification service (912) for evaluation.

The verification service 912 then verifies that the unique identifier is the expected result and sends a reply 922 to the relying party 910. In various embodiments, request (918), reply 922, and communication 920 with inbound interceptor 908 are sent via one or more of a 3G/4G network, WiFi, SMS, or any other appropriate communication channel/network.

Figure 10:
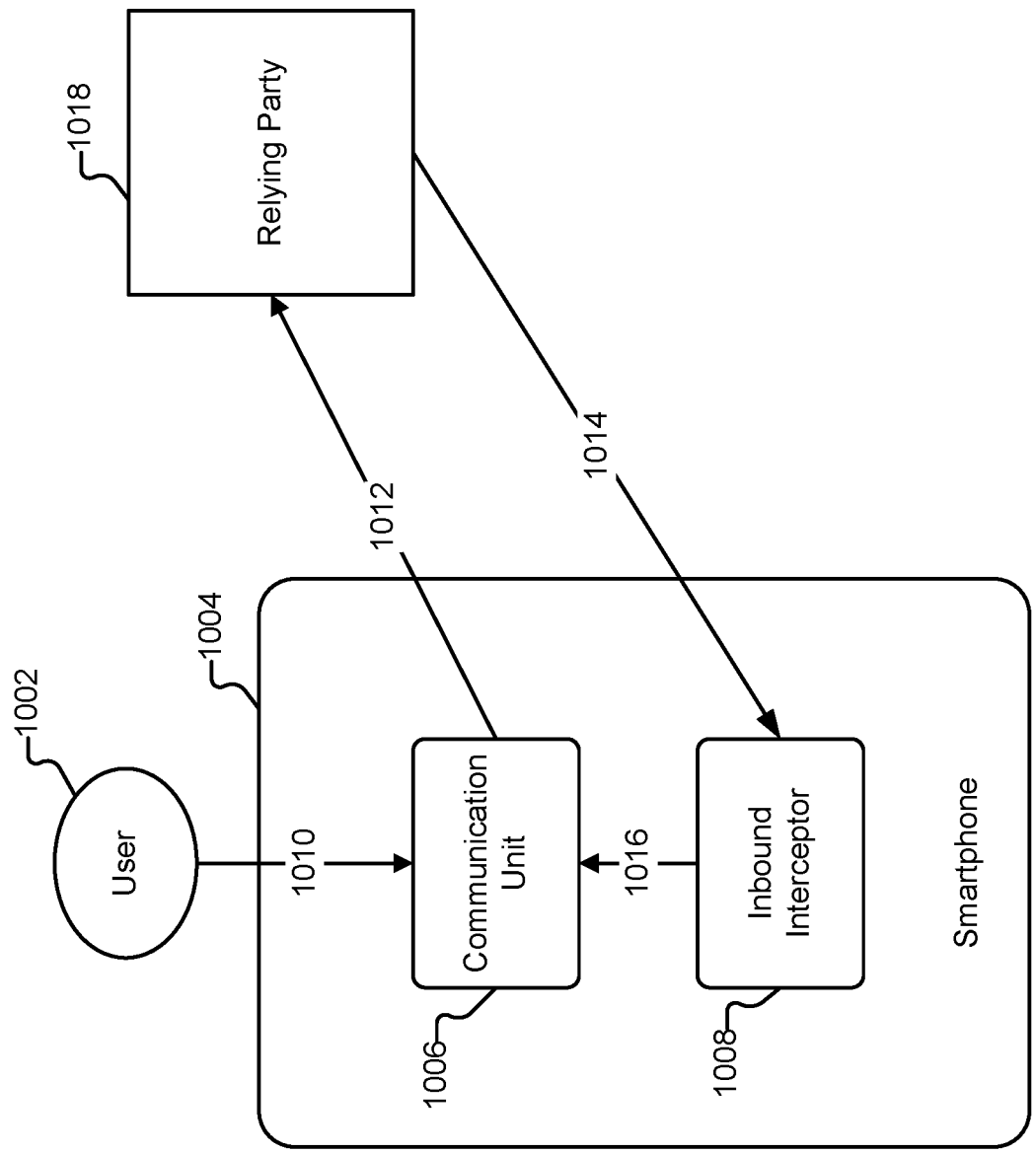
FIG. 10 illustrates an example of an environment in which verification of caller identification information is performed.

FIG. 10 illustrates an example of an environment in which verification of caller identification information is performed. In the example shown, a phone call is started (1010) by a user 1002 through a communication unit 1006 (which, in some embodiments, is an example of a communication unit such as communication unit 104 of FIG. 1) on smartphone device 1004 in order to make a phone call (over communication channel 1012) to relying party 1018.

In the example shown, the relying party (or an entity associated with the relying party) generates a unique identifier, which includes one or more of a number, phrase, tone, or any other appropriate unique identifier. The relying party passes the unique identifier to the user's device 1004 via a second communication channel (1014), such as short message service (SMS).

Inbound interceptor 1008, which in some embodiments, is an example portion of a communication unit such as communication 104 of FIG. 1, captures the incoming message sent via channel 1014 and recognizes that the message is from the relying party. The inbound interceptor extracts the unique identifier from message sent via channel 1014 and passes it, at 1016, to the communication unit 1006.

In the example shown, the communication unit 1006 inserts the unique identifier into the already open communication channel 1012 to the relying party. In one embodiment, using the already open communication channel 1012, the unique identifier is converted by the inbound interceptor 1008 into a tone or spoken phrase using text to speech, which is then inserted into communication channel 1012. The relying party receives the unique identifier, decodes, and verifies that it matches the expected value that was sent in message sent via channel 1014.

Figure 11:
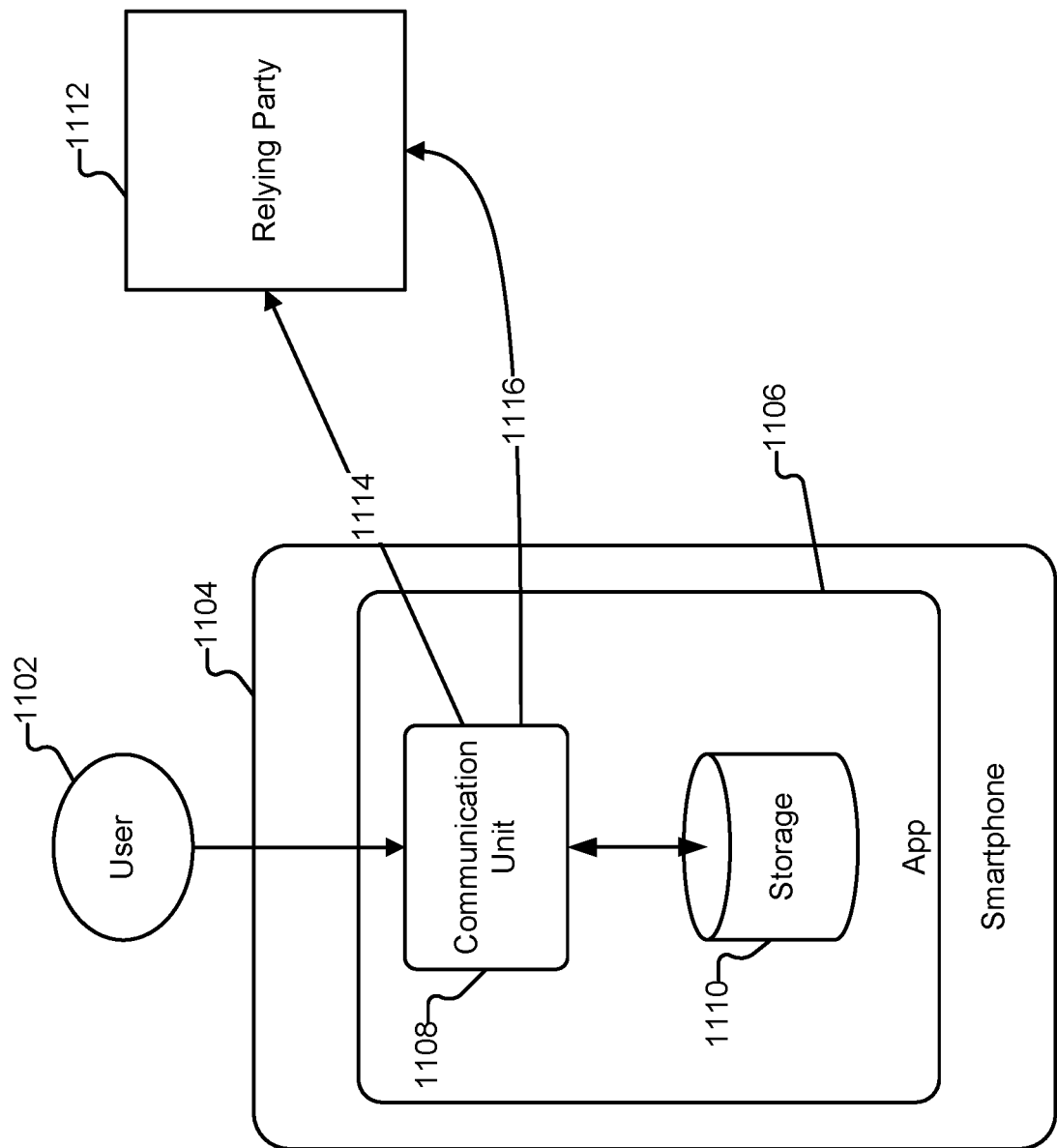
FIG. 11 illustrates an example of an environment in which verification of caller identification information is performed.

FIG. 11 illustrates an example of an environment in which verification of caller identification information is performed. In the example shown, a phone call 1114 to relying party 1112 is started by a communication unit 1108, which, in some embodiments, is an example of a communication unit such as communication unit 104 of FIG. 1. In this example, communication unit 1108 is a part of app 1106 installed on smartphone device 1104. In the example shown, the phone call is initiated when a user (1102) selects a phone number from a list that is already stored (e.g., in data store 1110) on the smartphone device.

Prior to, simultaneously, or immediately after starting call 1114, communication unit 1108 sends information to the relying party that is associated with the user-selected or provided phone number. The sent information includes information about the call, including one or more of a device identifier, call start time, and number called, that is sent via another communication path 1116 (which can be a network connection, SMS, etc.). The relying party compares the call information from the second path 1116 with the ANI observed on the first path to verify the source of the call.

Figure 12:
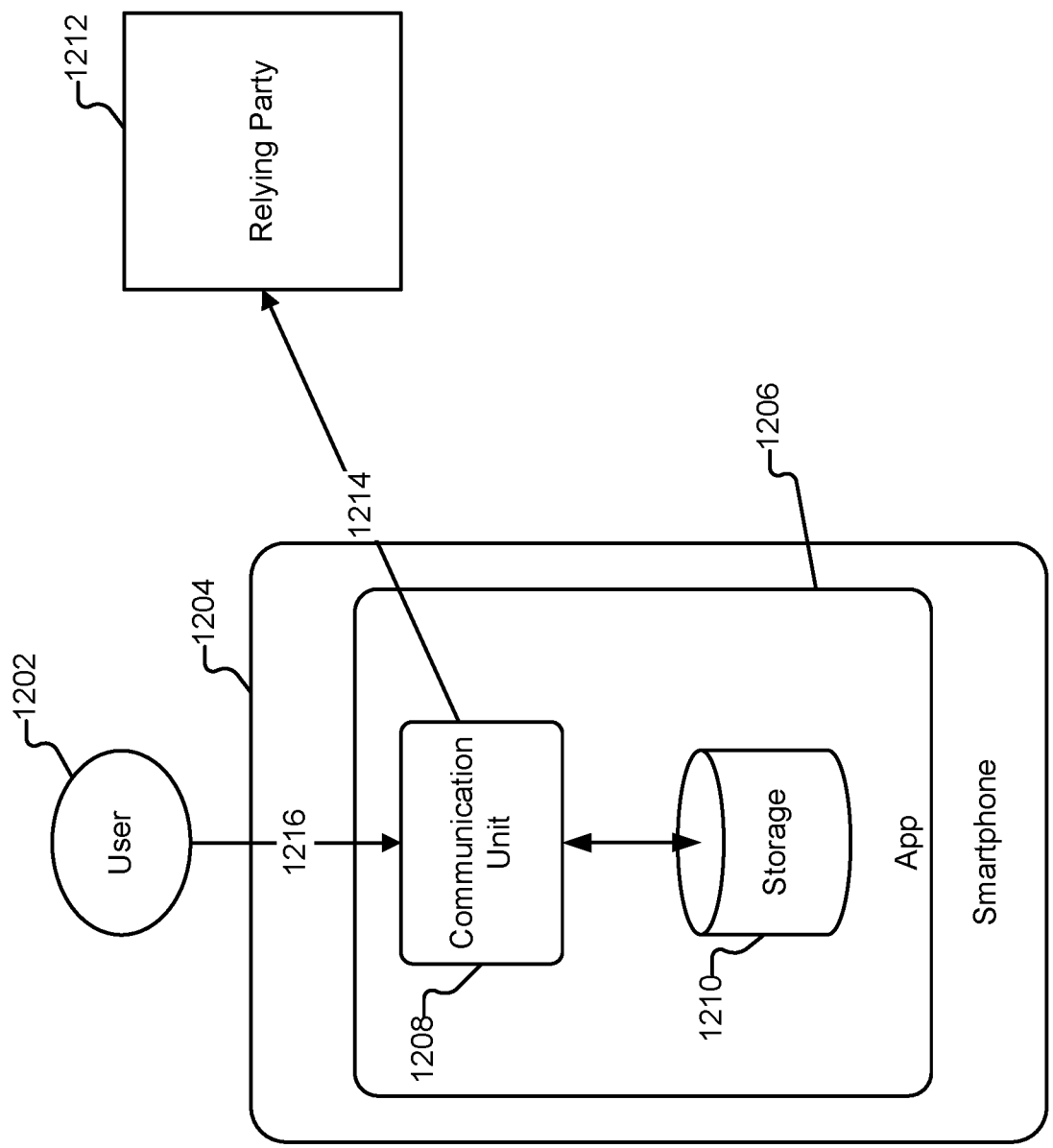
FIG. 12 illustrates an example of an environment in which verification of caller identification information is performed.

FIG. 12 illustrates an example of an environment in which verification of caller identification information is performed. In the example shown, a phone call (made over communication path 1214) to relying party 1212 is started by a communication unit 1208, which in some embodiments, is an example of a communication unit such as communication unit 104 of FIG. 1. In the example shown, communication unit 1208 is a component of app 1206. In this example, the phone call is started when a user 1202 selects, at 1216, a phone number from a list that is already stored in data storage 1210 of telephonic device 1204. Once the relying party answers call 1214, the communication unit 1208 sends information to the relying party about the call, including one or more of a device identifier, call start time, and number called. In the example shown, the information is sent, via the same communication path 1214, as one of more of an audible series of tones, an audible voice, as sounds that are not noticeable to the user, etc. The relying party detects and validates the received call information against the ANI sent by the caller.

Figure 13:
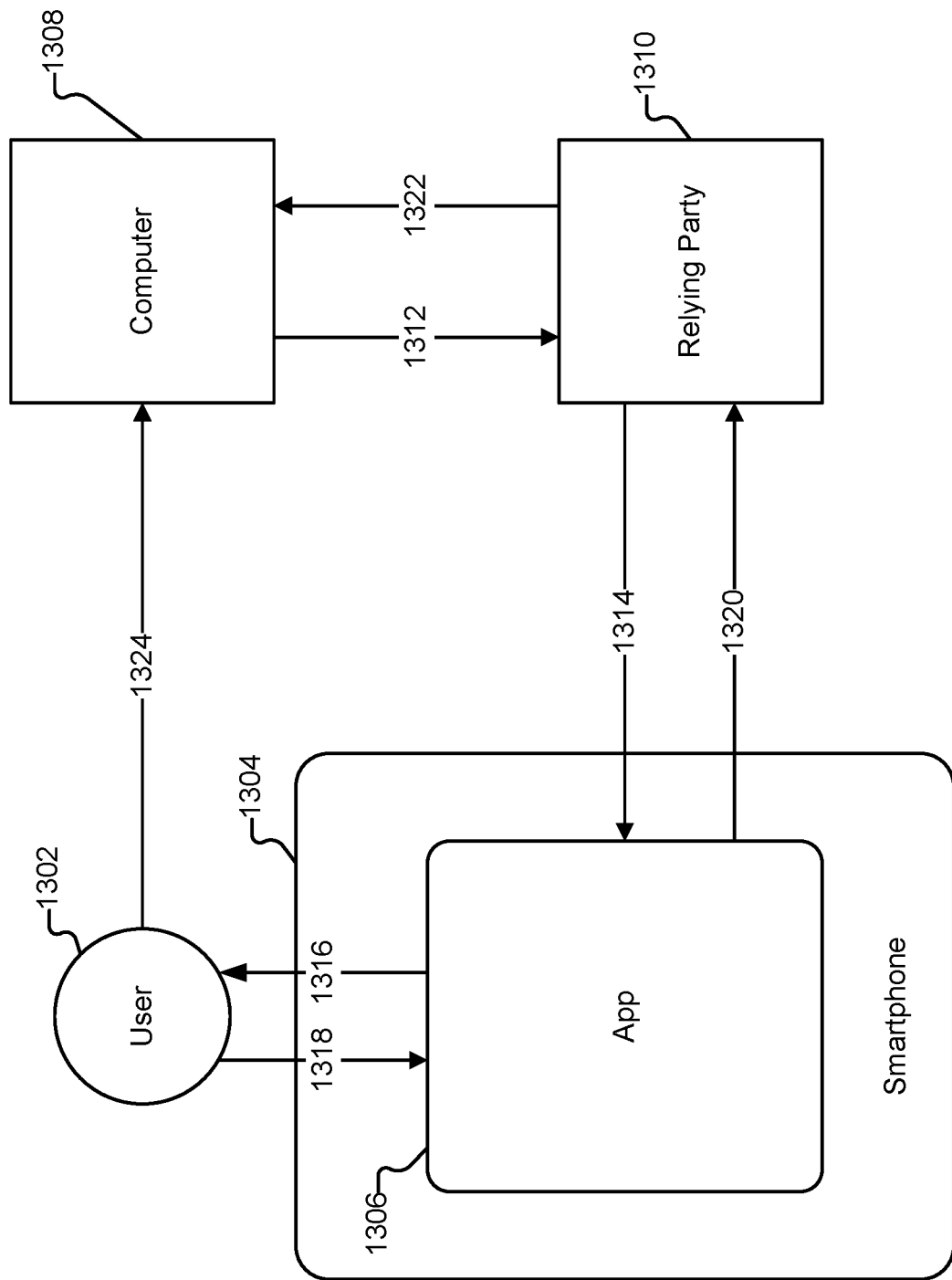
FIG. 13 illustrates an example of an environment in which verification of caller identification information is performed.

FIG. 13 illustrates an example of an environment in which verification of caller identification information is performed. In the example shown, app 1306 installed on smartphone device 1304 has been previously connected to an account at relying party 1310. The relying party account is accessed, at 1312, by computing device 1308, such as a desktop or laptop, when a user (1302) attempts, at 1324, to log into the account. The relying party recognizes the account and contacts, at 1314, app 1306 on the associated user's device 1304. The user's device requests, at 1316, that the user confirm the account access. The user, at 1318, either confirms or denies the access via the app. The app provides the confirmation (1320) back to the relying party, which, at 1322, grants or denies access via the computing device.

Figure 14:
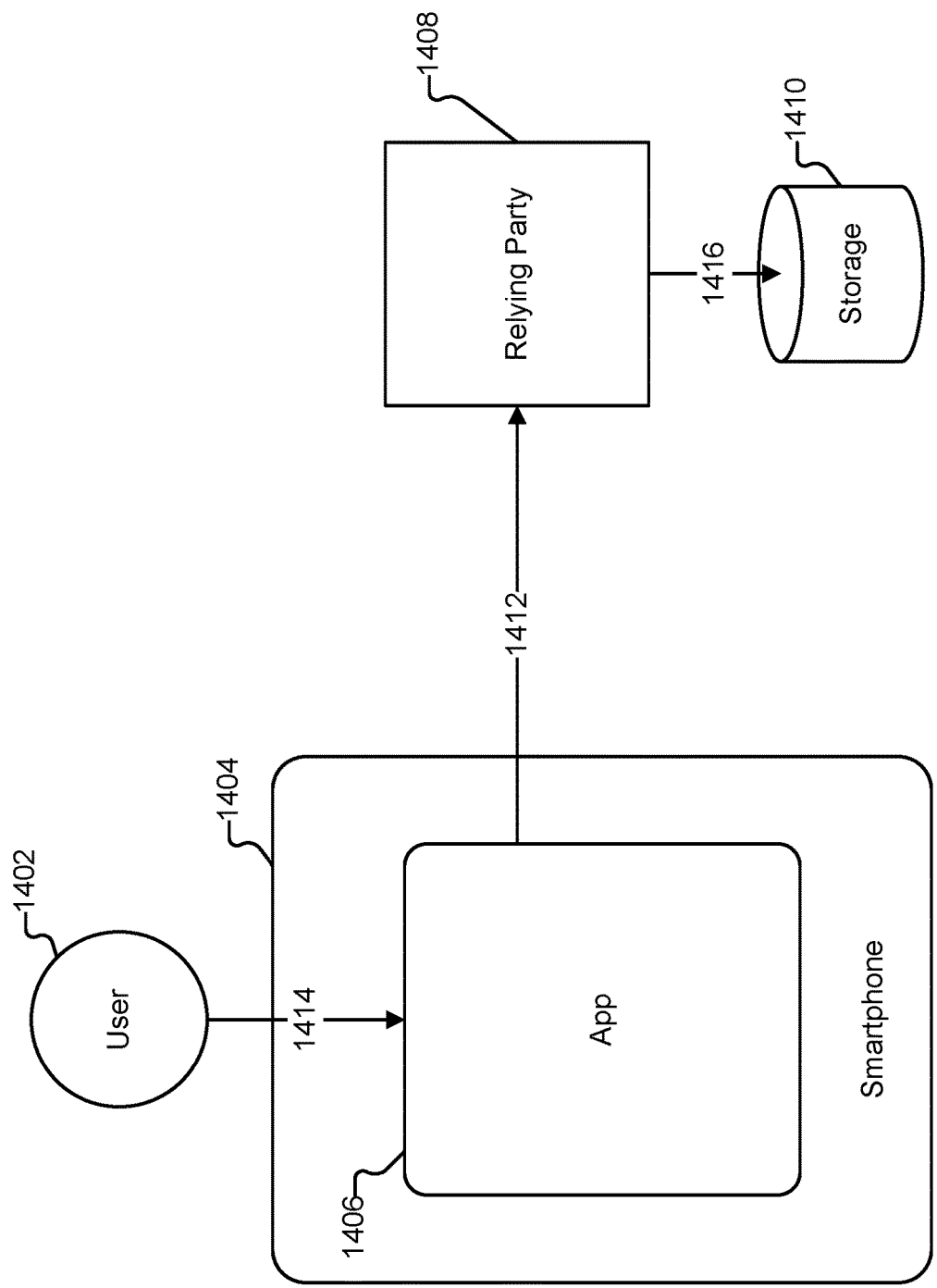
FIG. 14 illustrates an example of an environment in which verification of caller identification information is performed.

FIG. 14 illustrates an example of an environment in which verification of caller identification information is performed. In this example, app 1406 installed on smartphone 1404 places a phone call (1412) to relying party 1408 when a user (1402) enters a phone number at 1414. In this example, the app modifies the caller id or ANI of call 1412 to be a unique identifier that can be decoded by the relying party. The unique identifier is decoded by retrieving, at 1416, information that was previously stored in data storage 1410 when the instance of app 1406 was enrolled with the relying party.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a verification service provider, configured to, using one or more processors:
        enroll a first device with the verification service provider, wherein enrolling the first device includes associating, by the verification service provider, the first device with a device fingerprint that is generated based at least in part on a set of configuration information associated with the first device;
        store, at the verification service provider, the device fingerprint associated with the first device;
        obtain, at the verification service provider, information transmitted by a second device associated with a communications connection;
        perform, at the verification service provider, a security determination at least in part by determining whether the obtained information transmitted by the second device matches at least a portion of the stored device fingerprint that was generated based at least in part on the set of configuration information associated with the enrolled first device; and based at least in part on the security determination, select an action comprising at least one of blocking the communication, requesting additional authentication, and permitting the communication.

2. The system of claim 1, wherein the information transmitted by the second device is obtained via a backchannel that is different from the communications connection.

3. The system of claim 1, wherein based at least in part on the security determination, the verification service provider is further configured to convey an assurance to a recipient associated with the communications connection.

4. The system of claim 1, wherein the communications connection is associated with at least one of email, SMS, instant message, and a phone call.

5. The system of claim 1, wherein the first device comprises at least one of a smartphone, a tablet, a PC, a phablet, and a wearable device.

6. The system of claim 1, wherein enrolling the first device is based at least in part on at least one of PIN verification, password verification, knowledge-based authentication, geolocation information, credit card information validation, and a check of at least one of a name, an address, and a phone number.

7. The system of claim 1, wherein the additional authentication comprises at least one of PIN verification, password verification, knowledge-based authentication, geolocation information, credit card information validation, and a check of at least one of a name, an address, and a phone number.

8. The system of claim 1, wherein the set of configuration information comprises at least one of a set of device settings, a set of installed applications, system version information, application software version information, and a contact list associated with the first device.

9. The system of claim 1, wherein the verification service provider is further configured to re-enroll the first device in response to a determination of a change in the device fingerprint.

10. A method, comprising:
enrolling a first device with a verification service provider, wherein enrolling the first device includes associating, by the verification service provider, the first device with a device fingerprint that is generated based at least in part on a set of configuration information associated with the first device;
storing, at the verification service provider, the device fingerprint associated with the first device;
obtaining, at the verification service provider, information transmitted by a second device associated with a communications connection;
performing, at the verification service provider, a security determination at least in part by determining whether the obtained information transmitted by the second device matches at least a portion of the stored device fingerprint that was generated based at least in part on the set of configuration information associated with the enrolled first device; and
based at least in part on the security determination, selecting, at the verification service provider, an action comprising at least one of blocking the communication, requesting additional authentication, and permitting the communication.

11. The method of claim 10, wherein the information transmitted by the second device is obtained via a backchannel that is different from the communications connection.

12. The method of claim 10, wherein based at least in part on the security determination, the verification service provider is further configured to convey an assurance to a recipient associated with the communications connection.

13. The method of claim 10, wherein the communications connection is associated with at least one of email, SMS, instant message, and a phone call.

14. The method of claim 10, wherein the first device comprises at least one of a smartphone, a tablet, a PC, a phablet, and a wearable device.

15. The method of claim 10, wherein enrolling the first device is based at least in part on at least one of PIN verification, password verification, knowledge-based authentication, geolocation information, credit card information validation, and a check of at least one of a name, an address, and a phone number.

16. The method of claim 10, wherein the additional authentication comprises at least one of PIN verification, password verification, knowledge-based authentication, geolocation information, credit card information validation, and a check of at least one of a name, an address, and a phone number.

17. A computer program product embodied in a tangible and non-transitory computer readable storage medium and comprising computer instructions for:
enrolling a first device with a verification service provider, wherein enrolling the first device includes associating, by the verification service provider, the first device with a device fingerprint that is generated based at least in part on a set of configuration information associated with the first device;
storing, at the verification service provider, the device fingerprint associated with the first device;
obtaining, at the verification service provider, information transmitted by a second device associated with a communications connection;
performing, at the verification service provider, a security determination at least in part by determining whether the obtained information transmitted by the second device matches at least a portion of the stored device fingerprint that was generated based at least in part on the set of configuration information associated with the enrolled first device; and
based at least in part on the security determination, selecting, at the verification service provider, an action comprising at least one of blocking the communication, requesting additional authentication, and permitting the communication.

18. The computer program product of claim 17, wherein the information transmitted by the second device is obtained via a backchannel that is different from the communications connection.

19. The computer program product of claim 17, wherein based at least in part on the security determination, the verification service provider is further configured to convey an assurance to a recipient associated with the communications connection.

20. The computer program product of claim 17, wherein the communications connection is associated with at least one of email, SMS, instant message, and a phone call.

21. The computer program product of claim 17, wherein the first device comprises at least one of a smartphone, a tablet, a PC, a phablet, and a wearable device.

22. The computer program product of claim 17, wherein enrolling the first device is based at least in part on at least one of PIN verification, password verification, knowledge-based authentication, geolocation information, credit card information validation, and a check of at least one of a name, an address, and a phone number.

23. The computer program product of claim 17, wherein the additional authentication comprises at least one of PIN verification, password verification, knowledge-based authentication, geolocation information, credit card information validation, and a check of at least one of a name, an address, and a phone number.

\* \* \* \* \*